US011012871B2

(12) United States Patent
Tsuda

(10) Patent No.: US 11,012,871 B2
(45) Date of Patent: May 18, 2021

(54) APPARATUS AND METHOD

(71) Applicant: Sony Corporation, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/517,686

(22) Filed: Jul. 22, 2019

(65) Prior Publication Data
US 2019/0342773 A1 Nov. 7, 2019

Related U.S. Application Data

(63) Continuation of application No. 15/316,802, filed as application No. PCT/JP2015/063136 on May 1, 2015, now Pat. No. 10,412,602.

(30) Foreign Application Priority Data

Jun. 20, 2014 (JP) .................................. 2014-127451
Mar. 25, 2015 (JP) .................................. 2015-062339

(51) Int. Cl.
*H04W 24/02* (2009.01)
*H04W 84/04* (2009.01)
(Continued)

(52) U.S. Cl.
CPC .......... *H04W 24/02* (2013.01); *H04W 16/06* (2013.01); *H04W 24/10* (2013.01); *H04W 84/047* (2013.01); *H04W 88/04* (2013.01)

(58) Field of Classification Search
CPC ..... H04W 24/02; H04W 24/10; H04W 16/06; H04W 88/04; H04W 72/04; H04W 88/06; H04W 88/10
See application file for complete search history.

(56) References Cited

U.S. PATENT DOCUMENTS 9,713,014 B2   7/2017  Uchiyama et al.
9,736,808 B2   8/2017  Chika et al.
(Continued)

FOREIGN PATENT DOCUMENTS

EP        2503826 A1    9/2012
JP     2003-234686 A    8/2003
(Continued)

OTHER PUBLICATIONS

International Search report dated Aug. 4, 2015 in PCT/JP2015/063136 Filed May 1, 2015.

*Primary Examiner* — Khawar Iqbal
(74) *Attorney, Agent, or Firm* — Xsensus LLP

(57) ABSTRACT

There is provided an apparatus including: an acquisition unit configured to acquire measurement information or position-related information for each of one or more wireless communication devices capable of operating as a mobile station and a base station, the measurement information indicating a result of measurement for a cell by a wireless communication device, the position-related information being related to a position of a wireless communication device; and a selector configured to select a wireless communication device to operate as a base station from among the one or more wireless communication devices based on the measurement information or the position-related information for each of the one or more wireless communication devices.

22 Claims, 11 Drawing Sheets

(51) Int. Cl.
*H04W 88/04* (2009.01)
*H04W 16/06* (2009.01)
*H04W 24/10* (2009.01)

(56) References Cited

U.S. PATENT DOCUMENTS

| | | | |
|---|---|---|---|
| 9,980,304 B2 | 5/2018 | Huang et al. | |
| 10,264,510 B2* | 4/2019 | Jeong | H04W 40/22 |
| 10,292,186 B2* | 5/2019 | Li | H04L 5/0035 |
| 10,412,602 B2* | 9/2019 | Tsuda | H04W 24/02 |
| 10,506,475 B2* | 12/2019 | Cao | H04W 36/0022 |
| 10,609,602 B2* | 3/2020 | Maeda | H04W 84/005 |
| 2003/0072306 A1 | 4/2003 | Hunzinger | |
| 2009/0221287 A1 | 9/2009 | Balasubramanian et al. | |
| 2011/0019606 A1 | 1/2011 | Umeda et al. | |
| 2014/0011543 A1 | 1/2014 | Li et al. | |
| 2014/0105048 A1* | 4/2014 | Tellado | H04W 24/10 370/252 |
| 2014/0213244 A1 | 7/2014 | Oh et al. | |
| 2014/0269455 A1* | 9/2014 | Kim | H04B 7/15542 370/280 |
| 2014/0348023 A1* | 11/2014 | Mishra | H04W 84/02 370/254 |
| 2015/0085740 A1* | 3/2015 | Kalapatapu | H04W 4/80 370/315 |
| 2015/0133131 A1* | 5/2015 | Van Phan | H04W 88/04 455/450 |
| 2015/0156815 A1 | 6/2015 | Pang et al. | |
| 2015/0208452 A1* | 7/2015 | Lee | H04W 76/27 455/426.1 |
| 2015/0311967 A1* | 10/2015 | Boudreau | H04W 52/46 455/7 |
| 2015/0334750 A1 | 11/2015 | Mehta | |
| 2016/0007338 A1 | 1/2016 | Van Phan et al. | |
| 2016/0028572 A1 | 1/2016 | Suzuki et al. | |
| 2016/0029430 A1 | 1/2016 | Mishra et al. | |
| 2016/0081055 A1* | 3/2016 | Chika | H04W 36/32 370/315 |
| 2016/0143028 A1* | 5/2016 | Mancuso | H04W 12/08 370/338 |
| 2017/0086252 A1 | 3/2017 | Chai et al. | |
| 2017/0105145 A1 | 4/2017 | Tsuda | |
| 2017/0150376 A1 | 5/2017 | Shoshan et al. | |
| 2017/0347386 A1* | 11/2017 | Seo | H04W 72/0413 |
| 2017/0367147 A1* | 12/2017 | Kwon | H04B 7/2606 |
| 2018/0351602 A1* | 12/2018 | Sawai | H04B 3/36 |
| 2019/0082423 A1 | 3/2019 | Zhao et al. | |
| 2019/0090162 A1* | 3/2019 | Roy | H04W 36/14 |
| 2019/0098686 A1 | 3/2019 | Martin et al. | |
| 2020/0178262 A1* | 6/2020 | Mishra | H04W 72/0406 |

FOREIGN PATENT DOCUMENTS

| | | |
|---|---|---|
| JP | 2011-515910 A | 5/2011 |
| JP | 2013-051540 A | 3/2013 |
| WO | 2012/155971 A1 | 11/2012 |
| WO | 2014/034255 A1 | 3/2014 |

* cited by examiner

APPARATUS AND METHOD

CROSS-REFERENCE TO RELATED APPLICATIONS

This application is a continuation of U.S. application Ser. No. 15/316,802, filed Dec. 6, 2016, which is based on PCT filing PCT/JP2015/063136, filed May 1, 2015, and claims priority to JP 2014-127451, filed Jun. 20, 2014, and JP 2015-062339, filed Mar. 25, 2015, the entire contents of each are incorporated herein by reference.

TECHNICAL FIELD

The present disclosure relates to an apparatus and a method.

BACKGROUND ART

In 2002, the mobile phone service of the 3G system, called the third generation in Japan, started. At first, small-size packets were used for transmission or reception to perform voice calls and mail transmission. However, with the introduction of high-speed downlink packet access (HSDPA), it became possible to transmit and receive larger-size packets for downloading of music files or streaming of video. With such an increase of packet capacities, the service of long term evolution (LTE) in which orthogonal frequency division multiple access (OFDMA) is used on the downlink also started for the expansion on the side of the wireless network. In addition, the launch of 4G service is scheduled to be made in around 2015. Accordingly, up to one gigabit per second (Gbps) will be achieved in a semi-fixed environment and up to 100 Mbps will be achieved even in a mobile environment.

With such increase in network traffic, it is desirable that a small base station that is inexpensive and easy to install is provided, thereby preventing the concentration of traffic. Various techniques are developed for such a small cell.

In one example, Patent Literature 1 discloses the technique for selecting a device that operates as an access point for a mobile station based on the quality obtained by measuring a wireless signal transmitted from one or more terminal devices.

CITATION LIST

Patent Literature

Patent Literature 1: WO 2014/034255

SUMMARY OF INVENTION

Technical Problem

Although the technique disclosed in Patent Literature 1 enables a terminal device desirable for a mobile station to operate as a base station (access point), it is not necessarily able to operate the desirable terminal device as a base station for traffic offloading. In one example, in the technique disclosed in Patent Literature 1, it is not necessarily able to operate a terminal device located in the edge of a cell (e.g., macro cell) as a base station. Thus, in one example, flexible traffic offloading in a cell fails to be achieved.

Therefore, it is preferable to provide a mechanism for allowing flexible traffic offloading in a cell.

Solution to Problem

According to the present disclosure, there is provided an apparatus including: an acquisition unit configured to acquire measurement information or position-related information for each of one or more wireless communication devices capable of operating as a mobile station and a base station, the measurement information indicating a result of measurement for a cell by a wireless communication device, the position-related information being related to a position of a wireless communication device; and a selector configured to select a wireless communication device to operate as a base station from among the one or more wireless communication devices based on the measurement information or the position-related information for each of the one or more wireless communication devices.

According to the present disclosure, there is provided a method including: acquiring measurement information or position-related information for each of one or more wireless communication devices capable of operating as a mobile station and a base station, the measurement information indicating a result of measurement for a cell by a wireless communication device, the position-related information being related to a position of a wireless communication device; and selecting, by a processor, a wireless communication device to operate as a base station from among the one or more wireless communication devices based on the measurement information or the position-related information for each of the one or more wireless communication devices.

Advantageous Effects of Invention

According to the embodiments of the present disclosure described above, it is possible to achieve flexible traffic offloading in a cell. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
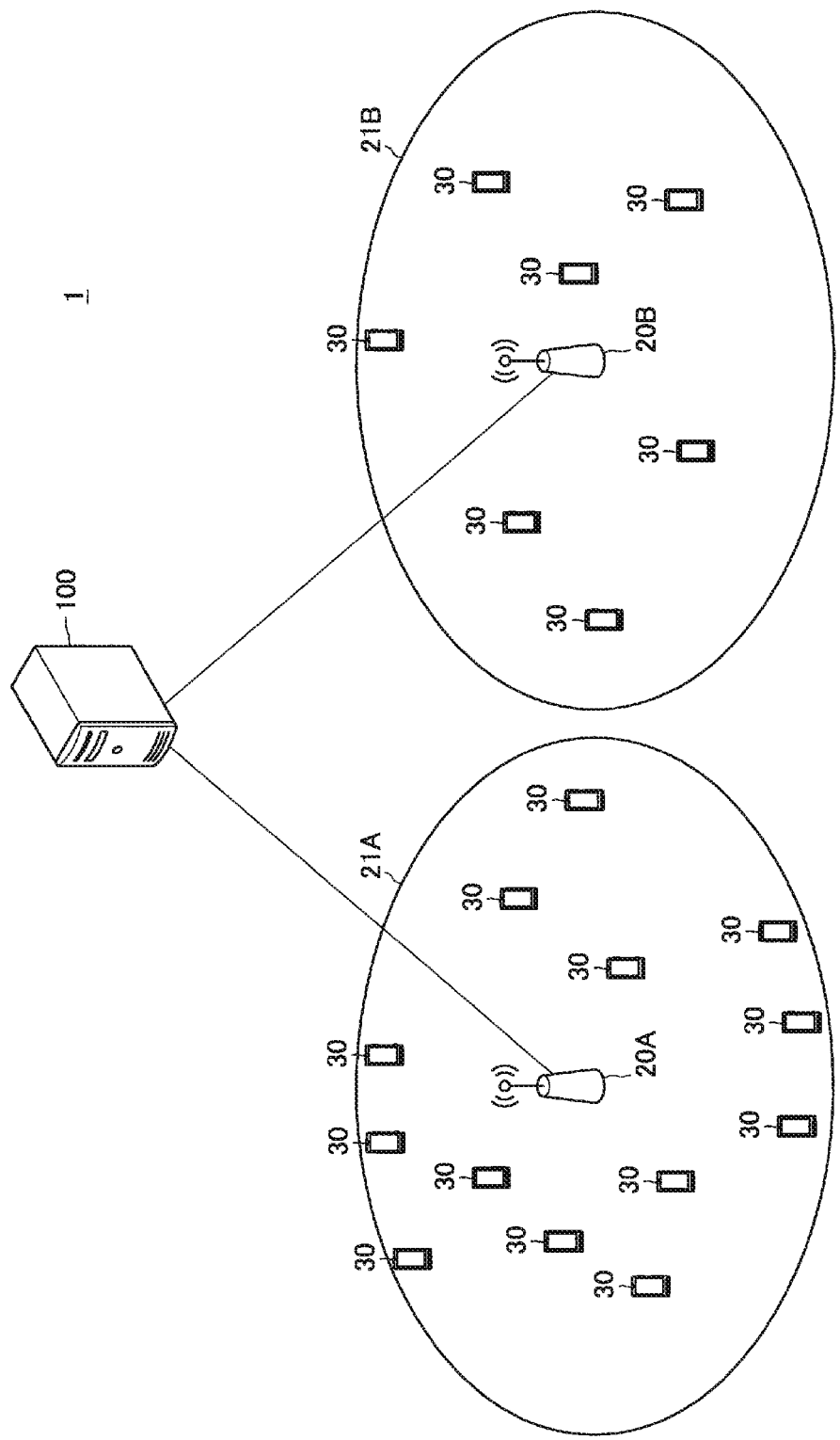
FIG. 1 is a diagram illustrated to describe an exemplary schematic configuration of a communication system according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In the specification and drawings, components having substantially identical functional structure are sometimes distinguished by appending different alphabet characters following identical reference numerals. In one example, a plurality of components having substantially identical functional structure are distinguished in a similar way to wireless communication devices 30A, 30B, and 30C, if necessary. However, identical reference numerals are appended in a case where there is no particular significance to distinguish between a plurality of components having substantially identical functional structure. In one example, when there is no particular significance to distinguish among wireless communication devices 30A, 30B, and 30C, they are simply referred to as wireless communication device 30.

The description is made in the following order.
1. First Embodiment
1.1. Configuration of Communication System
1.2. Configuration of Control Entity
1.3. Control for operating Wireless Communication Device as Base Station
1.4. Processing Procedure
1.5. Modification
2. Second Embodiment
2.1. Configuration of Communication System
2.2. Configuration of Control Entity
2.3. Control for operating Wireless Communication Device as Base Station
2.4. Processing Procedure
2.5. Modification
3. Application Examples
3.1. Application Example relating to Control Entity
3.2. Application Example relating to Base Station
4. Conclusion

1. FIRST EMBODIMENT

A first embodiment of the present disclosure is now described.

<1.1. Configuration of Communication System>

A schematic configuration of a communication system 1 according to the first embodiment is now described with reference to FIG. 1. FIG. 1 is a diagram illustrated to describe an exemplary schematic configuration of the communication system 1 according to the first embodiment. Referring to FIG. 1, the communication system 1 includes a base station 20, a wireless communication device 30, and a control entity 100.

(Base Station 20)

The base station 20 performs wireless communication with the wireless communication device 30. In one example, the base station 20 performs wireless communication with the wireless communication device 30 located in a cell 21 that is a communication area of the base station 20. More specifically, in one example, a base station 20A performs wireless communication with the wireless communication device 30 located in a cell 21A, and a base station 20B performs wireless communication with the wireless communication device 30 located in a cell 21B. In one example, the cell 21 is a macro cell, and the base station 20 is a base station in the macro cell. Alternatively, the cell 21 may be a small cell, and the base station 20 may be a base station in the small cell.

(Wireless Communication Device 30)

The wireless communication device 30 is capable of operating as both a mobile station and a base station.

In one example, the wireless communication device 30 operates as a mobile station. In one example, the wireless communication device 30 performs wireless communication with the base station 20. More specifically, in one example, the wireless communication device 30, when being located in the cell 21A of the base station 20A, performs wireless communication with the base station 20A. The wireless communication device 30, when being located in the cell 21B of the base station 20B, performs wireless communication with the base station 20B.

In one example, the wireless communication device 30 operates as a base station. In one example, the wireless communication device 30 performs wireless communication with another wireless communication device (e.g., another wireless communication device 30). More specifically, in one example, the wireless communication device 30 performs wireless communication with another wireless communication device that is located in a communication area of the wireless communication device 30.

(Control Entity 100)

The control entity 100 selects the wireless communication device 30 to operate as a base station. In particular, the control entity 100 selects the wireless communication device 30 to operate as a base station based on measurement information that indicates a result of measurement for a cell by one or more wireless communication devices 30 or based on position-related information that is related to the position of one or more wireless communication devices 30.

In one example, the control entity 100 performs control for operating the selected wireless communication device 30 as a base station.

In one example, the control entity 100 is a core network node. The core network node may be the existing core network node (e.g., mobility management entity (MME), serving gateway (S-GW), and packet data network (PDN) gateway (P-GW)), or may be a newly added core network node. Alternatively, the control entity 100 may be a node other than the core network node.

The communication system 1 according to the first embodiment has been described above. The communication system 1 may include one base station 20 instead of two base stations 20 (i.e., base station 20A and base station 20B), or alternatively may include three or more base stations 20. The communication system 1 may further include not only the wireless communication device 30 that is capable of operating as both a mobile station and a base station but also the wireless communication device that is capable of operating only as a mobile station.

1.2. Configuration of Control Entity

Figure 2:
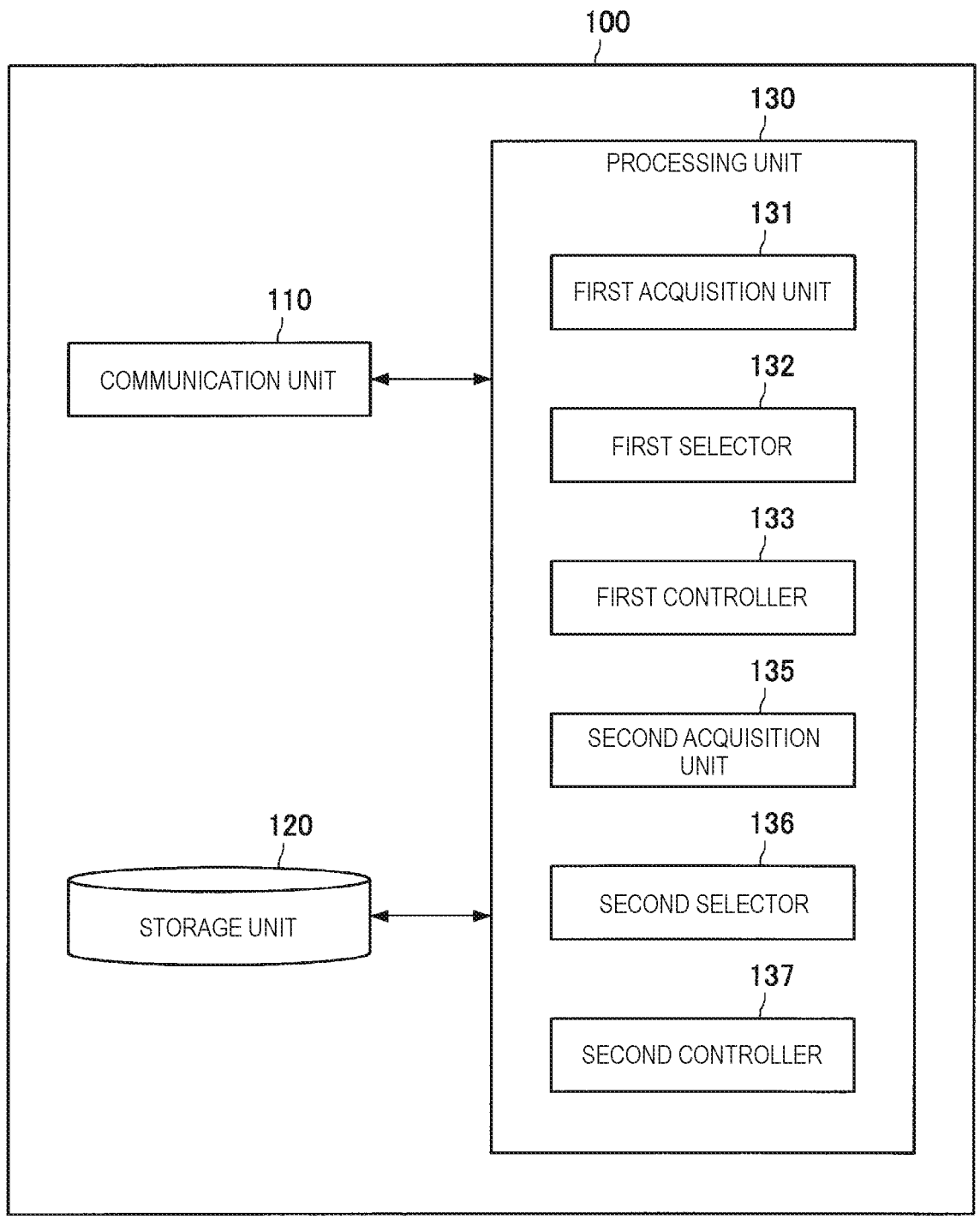
FIG. 2 is a block diagram illustrating an exemplary configuration of a control entity according to the first embodiment.

An exemplary configuration of the control entity 100 according to the first embodiment is now described with reference to FIGS. 2 to 4. FIG. 2 is a block diagram illustrating an exemplary configuration of the control entity 100 according to the first embodiment. Referring to FIG. 2, the control entity 100 is configured to include a communication unit 110, a storage unit 120, and a processing unit 130.

(Communication Unit 110)

The communication unit 110 transmits and receives information. In one example, the communication unit 110 transmits information to another node and receives information from another node. In one example, the other node includes the base station 20. In one example, the other node includes a core network node.

(Storage Unit 120)

The storage unit 120 stores a program and data used for operations of the control entity 100 on a temporary or permanent basis.

(Processing Unit 130)

The processing unit 130 enables the control entity 100 to perform various functions. The processing unit 130 is configured to include a first acquisition unit 131, a first selector 132, a first controller 133, a second acquisition unit 135, a second selector 136, and a second controller 137. The processing unit 130 may further include a component other than these components. In other words, the processing unit 130 may also perform an operation other than operations of these components.

(First Acquisition unit 131)

The first acquisition unit 131 acquires information relating to the base station 20 (referred to as "base station-related information" hereinafter). In one example, the first acquisition unit 131 acquires base station-related information for each of one or more base stations 20 (i.e., information relating to each of one or more base stations 20).

(a) Traffic Information

In one example, the base station-related information is information relating to traffic of the base station 20 (referred to as "traffic information" hereinafter). In one example, the first acquisition unit 131 acquires traffic information for each of one or more base stations 20 (i.e., information relating to traffic for each of one or more base stations 20).

(a-1) Example of Traffic Information

In one example, the traffic may be traffic that is processed previously by the base station 20. Alternatively, the traffic may be the traffic that is assumed to be processed later by the base station 20.

In one example, the traffic information is information that indicates the amount of traffic (e.g., total amount, average value, etc.) processed previously by the base station 20. In another example, it may be information that indicates the history of the amount of traffic processed previously by the base station 20. The traffic information may be information pertaining to the number of control information items that are processed previously by the base station 20 or that are assumed to be processed later.

(a-2) Approach to Acquisition

First Example

In the first example, the traffic information is provided for the control entity 100 by the base station 20. In one example, the base station 20 provides the traffic information for the control entity 100 in response to a request from the control entity 100 or by its own will.

In one example, the base station 20 provides the traffic information for the control entity 100, and the traffic information is stored in the storage unit 120. The first acquisition unit 131 acquires the traffic information from the storage unit 120 in any subsequent time.

Second Example

In the second example, the traffic information may be generated by the control entity 100 (the processing unit 130).

The processing unit 130 may generate the traffic information based on information indicating the quality of communication of the base station 20 (referred to as "communication quality information" hereinafter). The communication quality information may be provided for the control entity 100 by the wireless communication device 30 (or the base station 20). The wireless communication device 30 may include one or both of the wireless communication device 30 that is in a connected state and the wireless communication device 30 that is in an idle state. The wireless communication device 30 that is in the idle state may be in the connected state temporarily to provide the communication quality information.

The communication quality information may include information indicating reference signal received quality (RSRQ). Alternatively, the communication quality information may include information indicating the received energy per chip divided by the power density in band (Ec/No) or information indicating energy per chip over interference (Ec/Io).

In one example, the communication quality information includes information indicating the RSRQ, and the processing unit 130 may generate the traffic information based on the RSRQ. The RSRQ is represented by reference signal received power (RSRP)/(reference signal strength indicator (RSSI)/N). As the amount of traffic increases, the transmitted power over the frequency band increases, thereby increasing RSSI. In other words, as RSRQ decreases, the ratio of RSSI to RSRP increases, and thus it may be estimated that the amount of traffic is large. As RSRQ increases, the ratio of RSSI to RSRP decreases, and thus it may be estimated that the amount of traffic is small. Thus, in one example, the processing unit 130 may generate information indicating that the amount of traffic is large to be served as the traffic information when RSRQ decreases, but may generate information indicating that the amount of traffic is small to be served as the traffic information when RSRQ increases. When the communication quality information is provided by a plurality of wireless communication devices 30, the average value of RSRQ is calculated and the traffic information may be generated based on the average value.

The communication quality information may further include information indicating reference signal signal-to-noise ratio (RSSNR), signal to interference and noise ratio (SINR), and/or channel quality indicator (CQI). The use of such information makes it possible to estimate the amount of traffic with more accuracy.

The traffic information allows the base station 20 having a large load to be recognized.

(b) Second Example: Connected Device Information

The base station-related information may be information relating to a wireless communication device that is connected to the base station 20 (referred to as "connected device information" hereinafter). In one example, the first acquisition unit 131 may acquire the connected device information for each of one or more base stations 20 (i.e., information relating to a wireless communication device connected to each of one or more base stations 20).

(b-1) Example of Connected Device Information

In one example, the connected device information is information indicating the number of wireless communication devices that are connected to the base station 20 (referred to as "connection count" hereinafter). The wireless communication device may be the wireless communication device 30 that is capable of operating as both a mobile station and a base station, or may include the wireless communication device 30 and another wireless communication device (a wireless communication device capable of operating only as a mobile station).

The connection count may be the number of wireless communication devices (e.g., a wireless communication device in which the received power (e.g., reference signal received power (RSRP)) of a reference signal (RS) transmitted by the base station 20 is less than a threshold) that are located at the edge of the cell 21 of the base station 20. Alternatively, the connected device information may be information indicating the proportion (referred to as "connection proportion") of wireless communication devices located at the edge of the cell 21 of the base station 20 (e.g., a wireless communication device in which the received power (e.g., RSRP) of RS transmitted by the base station 20 is less than a threshold) to the wireless communication devices connected to the base station 20. This makes it possible to recognize whether the base station 20 is difficult to obtain the effect of link adaptation, in one example. The threshold may be updated dynamically.

(b-2) Approach to Acquisition

First Example

In the first example, the connected device information is provided for the control entity 100 by the base station 20. In one example, the base station 20 provides the connected device information for the control entity 100 in response to a request from the control entity 100 or by its own will.

In one example, the base station 20 provides the connected device information for the control entity 100, and the connected device information is stored in the storage unit 120. The first acquisition unit 131 acquires the connected device information from the storage unit 120 in any subsequent time.

Second Example

In the second example, the connected device information may be generated by the control entity 100 (the processing unit 130). In one example, the processing unit 130 may generate the connected device information based on the information provided by the base station 20.

The connected device information allows the base station 20 having a large load to be recognized.

(First Selector 132)

The first selector 132 selects the base station 20 from among one or more base stations 20. In one example, the first selector 132 selects the base station 20 from among one or more base stations 20 based on the base station-related information for each of one or more base stations 20. The first selector 132 may select one base station 20, or may select two or more base stations 20.

(a) Selection Based on Traffic Information

As described above, the base station-related information is the traffic information, in one example. In other words, the first selector 132 selects the base station 20 from among one or more base stations 20 based on the traffic information for each of one or more base stations 20 (i.e., information relating to traffic for each of one or more base stations 20)

In one example, the first selector 132 selects the base station 20 in which the amount of traffic is relatively large from among one or more base stations 20. Referring again to FIG. 1, in one example, the amount of traffic of the base station 20A is larger than the amount of traffic of the base station 20B. In this case, in one example, the first selector 132 selects the base station 20A rather than the base station 20A from between the base station 20A and the base station 20B.

In another example, the first selector 132 may select the base station 20 in which the amount of traffic is larger than a predetermined amount from among one or more base stations 20. Referring again to FIG. 1, in one example, the amount of traffic of the base station 20A may be larger than a predetermined amount, and the amount of traffic of the base station 20B may be smaller than the predetermined amount. In this case, the first selector 132 may select the base station 20A rather than the base station 20B from between the base station 20A and the base station 20B. The predetermined amount may be updated dynamically.

This makes it possible to select the base station 20 in which the amount of traffic is large (i.e., base station 20 having a large load), in one example.

(b) Selection Based on Connected Device Information

As described above, the base station-related information may be the connected device information. In other words, the first selector 132 may select the base station 20 from among one or more base stations 20 based on the connected device information for each of one or more base stations 20 (i.e., information relating to a wireless communication device connected to each of one or more base stations 20).

In one example, the first selector 132 selects the base station 20 in which the connection count (or connection proportion) is relatively large from among one or more base stations 20. Referring again to FIG. 1, in one example, the connection count of the base station 20A is larger than that of the base station 20B. In this case, in one example, the first selector 132 selects the base station 20A rather than the base station 20B from between the base station 20A and the base station 20B.

In another example, the first selector 132 may select the base station 20 in which the connection count (or connection proportion) is larger than a predetermined count (or predetermined proportion) from among one or more base stations 20. Referring again to FIG. 1, in one example, the connection count (or connection proportion) of the base station 20A is larger than a predetermined count (or predetermined proportion), and the connection count (or connection proportion) of the base station 20B is smaller than the predetermined count (or predetermined proportion). In this case, the first selector 132 may select the base station 20A rather than the base station 20B from between the base station 20A and the base station 20B. The predetermined count may be updated dynamically.

This makes it possible to select the base station 20 having a large load, in one example.

(First Controller 133)

The first controller 133 controls a request to one or more wireless communication devices 30 for a report on the measurement information or the position-related information.

(a) Measurement Information/Position-Related Information (a-1) Measurement Information The measurement information is information indicating a result of measurement for a cell by the wireless communication device 30.

In one example, the measurement information is information indicating RSRP and/or RSRQ. The measurement information may be information indicating another measurement item (e.g., received signal code power (RSCP), etc.).

In one example, the measurement information includes information indicating a result of measurement for a cell in which the wireless communication device 30 is located (i.e., a cell of the selected base station 20). The measurement information may further include information indicating a result of measurement for another cell (e.g., a cell adjacent to the selected base station 20).

(a-2) Position-Related Information

The position-related information is information relating to the position of the wireless communication device 30.

In one example, the position-related information is position information indicating the position of the wireless communication device 30. More specifically, in one example, the position-related information is information indicating the position measured by a global positioning system (GPS) receiver or information indicating the position measured based on a signal transmitted from an adjacent base station.

The position-related information may be information relating to the position of the wireless communication device 30 other than the position information. In one example, the position-related information may include information indicating a timing advanced (TA) value, information indicating the received power from a plurality of base stations, or the like.

(b) One or More Wireless Communication Device (b-1) Wireless Communication Device Located in Communication Area of Selected Base Station In one example, the one or more wireless communication devices 30 are wireless communication devices 30 located in the communication area of the base station 20 selected from among one or more base stations 20.

In one example, the base station 20 selected from among the one or more base stations 20 is the base station 20 selected by the first selector 132. More specifically, in one example, the base station 20 selected from among the one or more base stations 20 is the base station 20 selected based on information relating to traffic for each of the one or more base stations (i.e., the traffic information of the one or more base stations 20). Alternatively, the base station 20 selected from among the one or more base stations 20 is the base station 20 selected based on information relating to a wireless communication device connected to each of the one or more base stations 20 (i.e., the connected device information of the one or more base stations 20). This makes it possible to collect the measurement information or the position-related information from the wireless communication device 30 located in the communication area of the base station 20 having a large load, in one example. Thus, the wireless communication device 30 located in the communication area of the base station 20 having a large load is allowed to operate as a base station.

(b-2) Wireless Communication Device in Idle State

In one example, the one or more wireless communication devices 30 are wireless communication devices that are in an idle state. More specifically, in one example, the one or more wireless communication devices 30 are wireless communication devices that are in the radio resource control (RRC) idle state.

This makes it possible to collect the measurement information or the position-related information from the wireless communication device 30 that does not perform transmission or reception of data, in one example. Thus, the wireless communication device 30 that does not perform transmission or reception of data is allowed to operate as a base station. In other words, the traffic offloading can be performed without interfering with the transmission of data by the wireless communication device 30.

(b-3) Concrete Example

An example of the one or more wireless communication devices 30 (i.e., the wireless communication device 30 to be a target of a request for a report) is now described with reference to FIG. 3.

Figure 3:
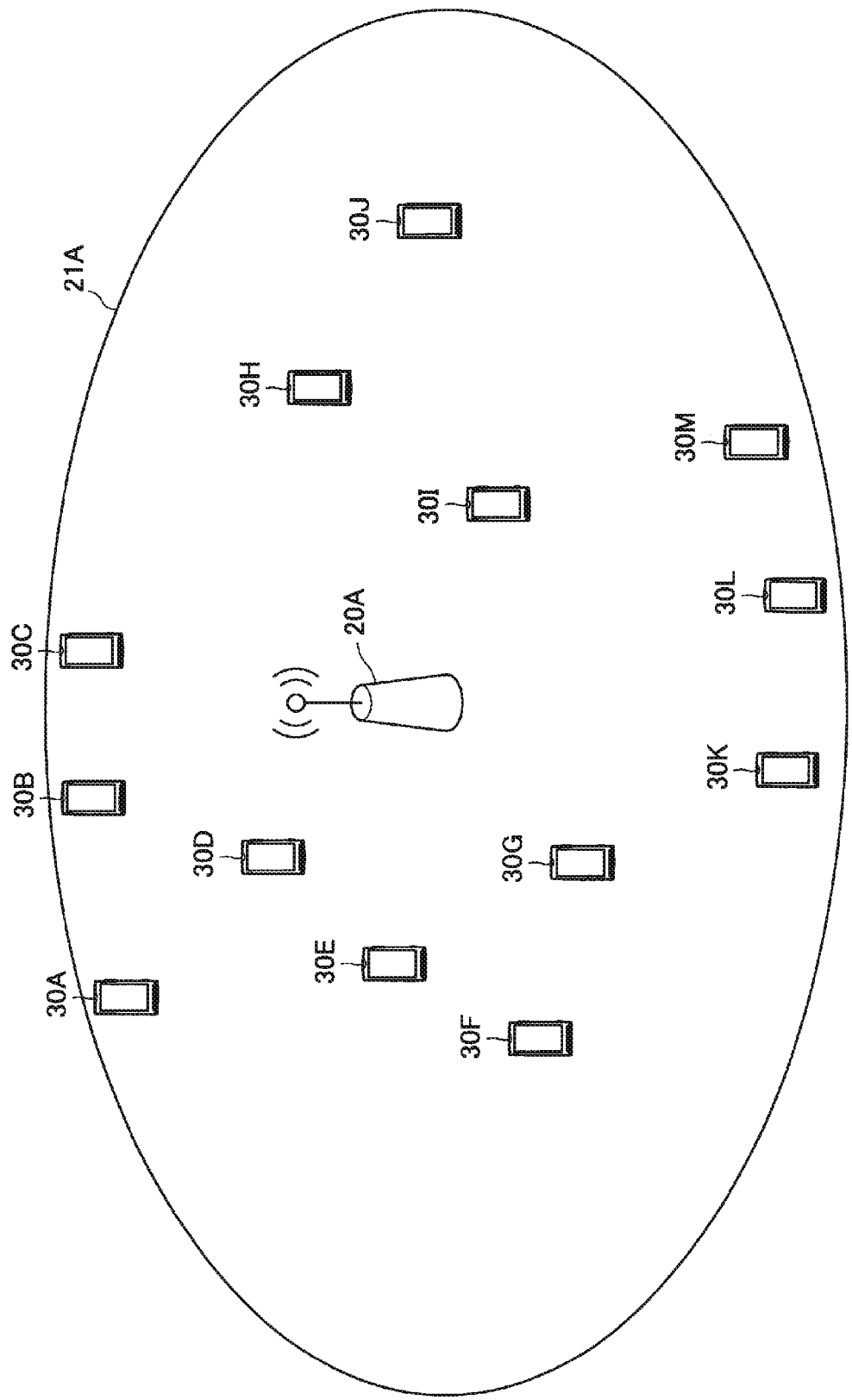
FIG. 3 is a diagram illustrated to describe an example of one or more wireless communication devices to be a target of a request for a report.

FIG. 3 is a diagram illustrated to describe an example of one or more wireless communication devices 30 to be a target of a request for a report. In one example, thirteen wireless communication devices 30A to 30M are located in the cell 21A that is the communication area of the selected base station 20A. Among the wireless communication devices 30A to 30M, the wireless communication devices 30B. 30E, 30I, and 30L are in the idle state, and other wireless communication devices 30 are in the connected state. In this case, the wireless communication devices 30B, 30E, 30I, and 30L are requested to report the measurement information or the position-related information.

(b-4) Wireless Communication Device Having Low Mobility

The one or more wireless communication devices 30 may be the wireless communication device 30 having low mobility.

In one example, information relating to the mobility of a plurality of wireless communication devices 30 may be provided for the control entity 100 (in one example, by the base station 20 or the core network node). The first controller 133 may select one or more wireless communication devices 30 having low mobility from among the plurality of wireless communication devices 30 as a target to be requested. Alternatively, the control entity 100 may be notified of one or more wireless communication devices 30 having low mobility (in one example, by the base station 20 or the core network node).

This makes it possible to operate the wireless communication device 30 that is more suitable for beam forming as a base station, in one example. Thus, the wireless communication device 30 that is more suitable for beam forming can operate as a base station. Thus, the wireless backhaul may be implemented by beam forming. The wireless communication device 30 that is located in a desired area in a long time may operate as a base station.

(c) Example of Control

(c-1) Request from Base Station

In the first example, the base station 20 (the base station 20 of the cell 21 in which the one or more wireless communication devices 30 are located (i.e., the selected base station 20)) requests the one or more wireless communication devices 30 to report the measurement information or the position-related information. In this case, in one example, the first controller 133 requests the base station 20 (i.e., the selected base station 20) of the cell 21 in which the one or more wireless communication devices 30 are located to request the one or more wireless communication devices 30 to report the measurement information or the position-related information. More specifically, in one example, the first controller 133 requests the base station 20 (i.e., the selected base station 20) of the cell 21 in which the one or more wireless communication devices 30 are located to transmit control information for requesting a report on the measurement information or the position-related information to the one or more wireless communication devices 30. In this way, the first controller 133 may control the request from the base station 20, in one example.

In one example, the control information is an RRC connection reconfiguration message, and it includes measurement configuration. The measurement configuration includes measurement objects, reporting configurations, measurement identities, measurement gap, or the like. The reporting configurations include measurement items (e.g., RSRP and/or RSRQ, or RSCP etc.) and an index relating to the reporting (periodic reporting or event-triggered reporting). The measurement for other cells may be performed in a period that is set by the measurement gap.

(c-2) Request from Control Entity

In the second example, the control entity 100 may request the one or more wireless communication devices 30 to report the measurement information or the position-related information. In this case, the first controller 133 may generate the control information for requesting a report on the measurement information or the position-related information (e.g., a report request message). The first controller 133 may transmit the control information (e.g., the report request message) to the one or more wireless communication devices 30 via the communication unit 110 (via the base station 20 (i.e., the selected base station 20) of the cell 21 in which the one or more wireless communication devices 30 are located). In one example, the first controller 133 may perform non-access stratum (NAS) signaling to the one or more wireless communication devices 30. In this way, the first controller 133 may control a request from the control entity 100, in one example.

(d) Multicast/Broadcast

The request may be a request using multicast or broadcast.

In one example, the control information for requesting a report on the measurement information or the position-related information may be multicast to the one or more wireless communication devices 30 (or the wireless communication device 30 including the one or more wireless communication devices) by the base station 20. Alternatively, the control information for requesting a report on the measurement information or the position-related information may be broadcast (in one example, by being carried in the system information) by the base station 20.

This allows a request to the one or more wireless communication devices 30 to be performed more efficiently, in one example.

In general, the core network node can recognize the position of a wireless communication device that is in a connected state (e.g., in RRC connected state) in units of cells (i.e., in units of base stations). On the other hand, the core network node can recognize the position of a wireless communication device that is in an idle state (e.g., in RRC idle state) only in units of tracking areas (or local areas). Thus, the base station 20 requesting a report using multicast allows a wireless communication device located in the communication area (i.e., in the cell) of the base station 20 to be requested for reporting.

(e) Conditional Report

The first controller 133 may control a request to the wireless communication device 30 including the one or more wireless communication devices 30 for a report on the measurement information or the position-related information. The report may be a report that is performed by the wireless communication device 30 that satisfies a report condition. The one or more wireless communication devices 30 may be the wireless communication device 30 that satisfies the report condition.

(e-1) Notification of Report Condition

In one example, when the request to the wireless communication device 30 including the one or more wireless communication devices 30 is performed, the report condition may be notified to the wireless communication device 30 (by the base station 20 or the control entity 100). Each of the wireless communication devices 30 may report the measurement information or the position-related information when the report condition is satisfied.

(e-2) Example of Report Condition

In one example, the report condition includes a case where the received power (e.g., RSRP) of a reference signal (RS) transmitted by the base station 20 in the wireless communication device 30 is less than a threshold. This makes it possible to cause the wireless communication device 30 located near the cell edge to perform a report, in one example.

In another example, the report condition may include a case where the remaining capacity of battery of the wireless communication device 30 is larger than a threshold and/or a case where the wireless communication device 30 is in charging mode (or alternatively, a case where the wireless communication device 30 is not in charging mode). This makes it possible to reduce the burden on the wireless communication device 30 in view of battery, in one example.

The report condition may be a case where the wireless communication device 30 has low mobility (e.g., a case where the moved distance in a most recent predetermined period is less than a threshold).

Such report condition allows the number of the wireless communication devices 30 performing a report to be limited, thereby reducing radio resources necessary for the report.

As described above, the first controller 133 controls a request to the one or more wireless communication devices 30 for the report on the measurement information or the position-related information, in one example. This makes it possible to obtain information used to specify a wireless communication device located in a desired area (e.g., a cell edge), in one example.

(Second Acquisition Unit 135)

The second acquisition unit 135 acquires measurement information (information indicating a result of measurement for a cell by the wireless communication device 30) or position-related information (information relating to the position of the wireless communication device 30) for each of the one or more wireless communication devices 30.

As described above, the base station 20 requests the one or more wireless communication devices 30 to report the measurement information or the position-related information, in one example. Then, each of the one or more wireless communication devices 30 reports the measurement information or the position-related information to the base station 20. Then, the base station 20 provides the control entity 100 with the measurement information or the position-related information for each of the one or more wireless communication devices 30. Then, the measurement information or the position-related information for each of the one or more wireless communication devices 30 is stored in the storage unit 120. The second acquisition unit 133 acquires the measurement information or the position-related information in any subsequent time.

Referring again to FIG. 3, as described above, among the wireless communication devices 30A to 30M, the wireless communication devices 30B, 30E, 30I, and 30L, which are in idle state, report the measurement information, in one example. Then, the second acquisition unit 135 acquires the measurement information or the position-related information for each of the wireless communication devices 30B, 30E, 30I, and 30L.

As described above, the control entity 100 may request the one or more wireless communication devices 30 to report the measurement information or the position-related information via the base station 20. In this case, each of the one or more wireless communication devices 30 may report the measurement information or the position-related information to the control entity 100 via the base station 20.

(Second Selector 136)

The second selector 136 selects the wireless communication device 30 that is to operate as a base station among from the one or more wireless communication devices 30 based on the measurement information or the position-related information for each of the one or more wireless communication devices 30.

(a) Selection Based on Measurement Information

In one example, the second acquisition unit 135 acquires the measurement information for each of the one or more wireless communication devices 30 (information indicating a result of measurement for a cell by the wireless communication device 30). Then, the second selector 136 selects the wireless communication device 30 that is to operate as a base station among from the one or more wireless communication devices 30 based on the measurement information for each of the one or more wireless communication devices 30.

(a-1) First Example

As described above, the measurement information includes information indicating a result of measurement for a cell in which the wireless communication device 30 is located (i.e., a cell of the selected base station 20), in one example. Then, the second selector 136 selects the wireless communication device 30 in which the measured result for the cell is unsuccessful from among the one or more wireless communication devices 30.

More specifically, in one example, the measurement information includes the RSRP for the cell in which the wireless communication device 30 is located (i.e., the cell of the selected base station 20). Then, the second selector 136 selects the wireless communication device 30 in which the RSRP for the cell is low (in one example, the RSRP is less than a threshold).

Referring again to FIG. 3, as described above, among the wireless communication devices 30A to 30M, the wireless communication devices 30B. 30E, 30I, and 30L, which are in the idle state, report the measurement information, in one example. The RSRP reported by the wireless communication devices 30E and 30I is high, but the RSRP reported by the wireless communication devices 30B and 30L is low. Thus, the wireless communication devices 30B and 30L are selected as the wireless communication device 30 that is to operate as a base station.

This makes it possible to operate the wireless communication device 30 located in the cell edge as a base station, in one example.

(a-2) Second Example

As described above, the measurement information may further include a result of measurement for another cell (e.g., a cell adjacent to the selected base station 20) in addition to the result of measurement for the cell in which the wireless communication device 30 is located (i.e., the cell of the selected base station 20). The second selector 136 may select the wireless communication device 30 in which a result of measurement for any cell is unsuccessful.

This makes it possible to operate the wireless communication device 30 that is distant from any base station as a base station, in one example. In one example, it is possible to operate the wireless communication device 30 that is located at the edge of a cell (e.g., a macro cell) but is not located near a small cell as a base station.

(b) Selection Based on Position-Related Information

In one example, the second acquisition unit 135 acquires the position-related information (information relating to the position of the wireless communication device 30) for each of the one or more wireless communication devices 30. The second selector 136 selects the wireless communication device 30 that is to operate as a base station among from the one or more wireless communication devices 30 based on the position-related information for each of the one or more wireless communication devices 30.

In one example, the second selector 136 selects the wireless communication device 30 that is located in a desired area from among the one or more wireless communication devices 30. In one example, the desired area is the edge of a cell (e.g., a cell of the selected base station 20). In another example, the desired area may be an area that is distant from any base station. As still another example, the desired area may be an area in which the wireless communication devices 30 that are in the connected state are densely distributed.

This makes it possible to operate the wireless communication device 30 located in a desired area as a base station, in one example.

(c) Selection Based on Mobility Information

The second acquisition unit 135 may acquire mobility information relating to the mobility of the one or more wireless communication devices 30 together with the measurement information or the position-related information. The selected wireless communication device 30 may be a wireless communication device 30 having low mobility. This makes it possible to operate the wireless communication device 30 suitable for beam forming as a base station, in one example. Consequently, the wireless communication device 30 suitable for beam forming can operate as a base station. Thus, the wireless backhaul may be implemented by beam forming. The wireless communication device 30 that is located in a desired area in a long time can operate as a base station.

(Second Controller 137)

(a) Control for Operation as Base Station

The second controller 137 performs control for operating the selected wireless communication device 30 as a base station (referred to as "control for operation as base station" hereinafter). This allows the selected wireless communication device 30 to operate as a base station actually, in one example. An example of the control for operation as base station will be described in more detail later.

(b) Management of Information Relating to Wireless Communication Device Operating as Base Station In one example, the second controller 137 manages information relating to the wireless communication device 30 operating as a base station (wireless communication device-related information).

(b-1) Example of Wireless Communication Device-related Information

In one example, the wireless communication device-related information includes information indicating an operation mode (e.g., a base station mode, a mobile station mode, etc.) of the wireless communication device 30.

In one example, the wireless communication device-related information includes information relating to a frequency band to be used when the wireless communication device 30 operates as a base station. In one example, this information includes information indicating a frequency band and/or information indicating the maximum transmitted power.

In one example, the wireless communication device-related information includes information relating to wireless backhaul between the wireless communication device 30 and a base station. In one example, this information includes information indicating a base station that provides the wireless backhaul, information indicating a frequency band that can be used for the wireless backhaul and/or information indicating the maximum transmitted power.

The wireless communication device-related information may include information relating to the position of the wireless communication device 30.

(b-2) Example of Management

In one example, the second controller 137 performs recording and updating of the wireless communication device-related information.

More specifically, in one example, the selected wireless communication device 30, when being requested to operate as a base station, starts an operation as a base station and reports that the operation is started, as described later. The selected wireless communication device 30 provides the information relating to the selected wireless communication device 30 (i.e., the wireless communication device-related information) at the time of reporting. Then, the control entity 100 (the second controller 137) records the information (in one example, in the storage unit 120). In other words, when the information relating to the selected wireless communication device 30 (i.e., the wireless communication device-related information) is recorded, the control entity 100 (the second controller 137) updates the information.

Some or all of the wireless communication device-related information items are possible not to be provided from the selected wireless communication device 30. In one example, some or all of the wireless communication device-related information items may be provided from other devices, or may be known to the control entity 100.

1.3. Control for Operating Wireless Communication Device as Base Station

An example of control for operating the selected wireless communication device 30 as a base station (i.e., the control for operation as base station) is now described.

First Control Example: Request for Operation as Base Station

In one example, the control for operation as base station includes controlling a request for causing the selected wireless communication device 30 to operate as a base station.

(a) Request from Control Entity

In the first example, the control entity 100 requests the selected wireless communication device 30 to operate as a base station. In this case, in one example, the second controller 137 generates control information for requesting it to operate as a base station (e.g., an operation request message). Then, the second controller 137 transmits the control information (e.g., the operation request message) to the selected wireless communication device 30 via the communication unit 110 (via the base station 20). In one example, the second controller 137 performs the NAS signaling to one or more wireless communication devices 30. In one example, in this way, the second controller 137 controls the request from the control entity 100.

(b) Request from Base Station

In the second example, the base station 20 (the base station 20 of the cell 21 in which the selected wireless communication device 30 is located (i.e., selected base station 20)) may request the selected wireless communication device 30 to operate as a base station. In this case, the second controller 137 may request the base station 20 to transmit the control information for requesting it to operate as a base station (e.g., an operation request message) to the selected wireless communication device 30. Then, the base station 20 may request the selected wireless communication device 30 to operate as a base station, for example, by the RRC signaling. In this way, the second controller 137 may control a request from the base station 20, in one example.

When the wireless communication device 30 that is in the idle state is selected as the wireless communication device to operate as a base station, the wireless communication device 30 that is in the idle state becomes in the connected state by paging or the like prior to the transmission of the control information, in one example.

Second Control Example: Provision of Information

In one example, the control for operation as base station includes providing information for the selected wireless communication device 30.

(a) Example of Information to be Provided (a-1) Access Information

In one example, the control for operation as base station includes providing control information used for wireless communication between the selected wireless communication device 30 and a mobile station (referred to as "access information" hereinafter).

In one example, the access information includes information indicating a frequency band that can be used for the wireless communication. Furthermore, in one example, the access information includes information indicating a period that can be used for the frequency band. The access information includes information indicating the maximum transmitted power for the wireless communication.

In one example, the frequency band and/or the maximum transmitted power is determined so that the interference to other base stations is avoided or prevented. In one example, for each combination between the frequency band (e.g., each component carrier) and the maximum transmitted power, when the selected wireless communication device 30 transmits a signal with the maximum transmitted power using the frequency band, the amount of interference given to an adjacent base station is calculated. With the amount of interference that is less than or equal to an allowable level, the combination between the frequency band and the maximum transmitted power is determined as the combination between the frequency band that can be used for the wireless communication and the maximum transmitted power for the wireless communication.

This makes it possible to avoid or prevent the interference to other base stations from the wireless communication device 30 operating as a base station, in one example.

(a-2) Wireless Backhaul Information

In one example, the control for operation as base station includes providing control information used for the wireless backhaul between the selected wireless communication device 30 and a base station (referred to as "wireless backhaul information" hereinafter).

Base Station

In one example, the wireless backhaul information includes information indicating the base station (i.e., the base station that provides the wireless backhaul). In one example, the base station is a base station having the wireless backhaul capability. In one example, the information is a cell ID.

In one example, the base station (i.e., the base station that provides the wireless backhaul) is the selected base station 20 (i.e., the base station 20 of the cell 21 in which the selected wireless communication device 30 is located). Alternatively, the base station may be another base station that is different from the selected base station 20, as described later.

This makes it possible to allow the selected wireless communication device 30 to use the wireless backhaul reliably, in one example, even when a base station having the wireless backhaul capability and a base station having no wireless backhaul capability are located together.

Frequency Band

In one example, the wireless backhaul information includes information indicating a frequency band that can be used for the wireless backhaul.

In the first example, the frequency band is a frequency band for the wireless backhaul. In one example, the frequency band is a millimeter wave band.

In the second example, the frequency band may be a frequency band that is allowed to use of the shared bands that are shared among a plurality of wireless communication systems. The shared band may be a frequency band using TV white spaces (TVWS), or may be a frequency band using spectrum access system (SAS).

In the third example, the frequency band may be some or all of the frequency bands that can be used by the base station 20 of the cell 21 in which the selected wireless communication device 30 is located. In other words, the frequency band may be a frequency band of a license band of a cellular system. In one example, the frequency band may be a frequency band that is not used in the cellular system (temporarily or permanently). In another example, the frequency band may be a frequency band that is capable of avoiding or preventing interference.

This makes it possible to be connected to the core network through the wireless backhaul as a base station, in one example.

(a-3) Core Network Node Information

In one example, the control for operation as base station includes providing information relating to the core network node to be connected by the selected wireless communication device 30 (referred to as "core network node information" hereinafter).

In one example, the core network node includes a gateway of a core network. The gateway includes an S-GW and/or P-GW, in one example. The core network node includes an MME, in one example.

In one example, the core network node information includes information that contains an address of the core network node and/or information indicating a protocol or interface between the core network nodes.

This allows the wireless communication device 30 to communicate with the core network node by operating as a base station, in one example.

(b) Provision of Information

In the first example, the second controller 137 provides the control information for the selected wireless communication device 30. In one example, the second controller 137 provides the control information for the selected wireless communication device 30 using the NAS signaling.

In the second example, the second controller 137 may provide the control information for the base station 20 of the cell 21 in which the selected wireless communication device 30 is located (i.e., the selected base station 20). Then, the base station 20 may provide the control information for the selected wireless communication device 30 (e.g., by the RRC signaling).

Third Control Example: Control for Handover

In one example, the control for operation as base station includes control for a handover to the selected wireless communication device 30.

(a) First Example

In the first example, the second controller 137 requests the base station 20 of the cell 21 in which the selected wireless communication device 30 is located (i.e., the selected base station 20) to perform a handover to the selected wireless communication device 30 (an adjacent wireless communication device operating as a mobile station).

Referring again to FIG. 3, as described above, the wireless communication devices 30B and 30L are selected as the wireless communication device 30 to operate as a base station, in one example. The second controller 137 requests the base station 20A to perform a handover to the selected wireless communication devices 30B and 30L. Then, the base station 20A performs a handover of the wireless communication devices 30A and 30C, which are located near the wireless communication device 30B, to the wireless communication device 30B (operating as a base station). This allows the wireless communication devices 30A and 30C to perform wireless communication with the wireless communication device 30B operating as a base station. The base station 20A performs a handover of the wireless communication devices 30K and 30M, which are located near the wireless communication device 30L, to the wireless communication device 30L (operating as a base station). This allows the wireless communication devices 30K and 30M to perform wireless communication with the wireless communication device 30L operating as a base station.

This makes is possible to offload the traffic of the selected base station 20, in one example.

(b) Second Example

In the second example, the second controller 137 may request a base station that is adjacent to the selected wireless communication device 30 to add a cell of the selected wireless communication device 30 to a neighbor cell list. This base station may include the selected base station 20. Thus, this base station may transmit the neighbor cell list including a cell of the selected wireless communication device 30. This allows another wireless communication device to perform a measurement report on the selected wireless communication device 30, in one example. Thus, it is possible to perform the handover to the selected wireless communication device 30. Consequently, it is possible to offload the traffic of the selected base station 20.

When the operation as a base station by the selected wireless communication device 30 is stopped, the second controller 137 may request a base station that is adjacent to the selected wireless communication device 30 to delete the cell of the selected wireless communication device 30 from the neighbor cell list. Consequently, the base station may transmit the neighbor cell list that does not include the cell of the selected wireless communication device 30.

(c) Third Example

In the third example, the second controller 137 may request a base station that is adjacent to the selected wireless communication device 30 to change a parameter relating to the measurement. The parameter may be determined so that the cell of the selected wireless communication device 30 is selected with more ease.

The parameter may include a threshold and/or offset for an event of measurement report. The parameter may include a variable relating to S-criterion for cell selection/cell-reselection. The parameter may include the transmitted power of the reference signal.

Fourth Control Example: Selection of Base Station Providing Wireless Backhaul

The control for operation as base station may include selecting a base station that provides the wireless backhaul to the selected wireless communication device 30 (i.e., a device operating as a base station).

In the first case, the base station 20 selected by the first selector 132 (i.e., the base station 20 of the cell 21 in which the selected wireless communication device 30 is located) may be connected to the core network through a wired backhaul. In this case, the second controller 137 may select the base station 20 selected by the first selector 132 as the base station that provides the wireless backhaul to the selected wireless communication device 30.

In the second case, the base station 20 selected by the first selector 132 (i.e., the base station 20 of the cell 21 in which the selected wireless communication device 30 is located) may be connected to the core network through the wireless backhaul (and wired backhaul). In this case, the second controller 137 may select another base station that is connected to the core network through the wired backhaul as the base station that provides the wireless backhaul to the selected wireless communication device 30. In one example, the other base station may be a base station that is located near the base station 20 selected by the first selector 132 (e.g., a small cell base station located in the cell 21 of the base station 20 or a base station adjacent to the base station 20). In another example, the other base station may be a base station located near the selected wireless communication device 30 (e.g., a small cell base station located in the cell 21 of the base station 20 or a base station adjacent to the base station 20).

This can improve the capacity.

In the second case described above, the interference of wireless backhaul is likely to occur between the base station 20 selected by the first selector 132 (i.e., the base station connected to the core network through the wireless backhaul) and the selected wireless communication device 30 (i.e., the wireless communication device operating as a base station). In such a case, the transmitted power of the wireless backhaul of the base station 20 selected by the first selector 132 may be lowered. Furthermore, a terminal device connected to the base station 20 selected by the first selector 132 may be handed over to the selected wireless communication device 30 (i.e., the wireless communication device operating as a base station). Consequently, it is possible to prevent the interference of wireless backhaul.

(Example of Wireless Communication Device Operating as Base Station)

An example of the wireless communication device 30 operating as a base station is now described with reference to FIG. 4.

Figure 4:
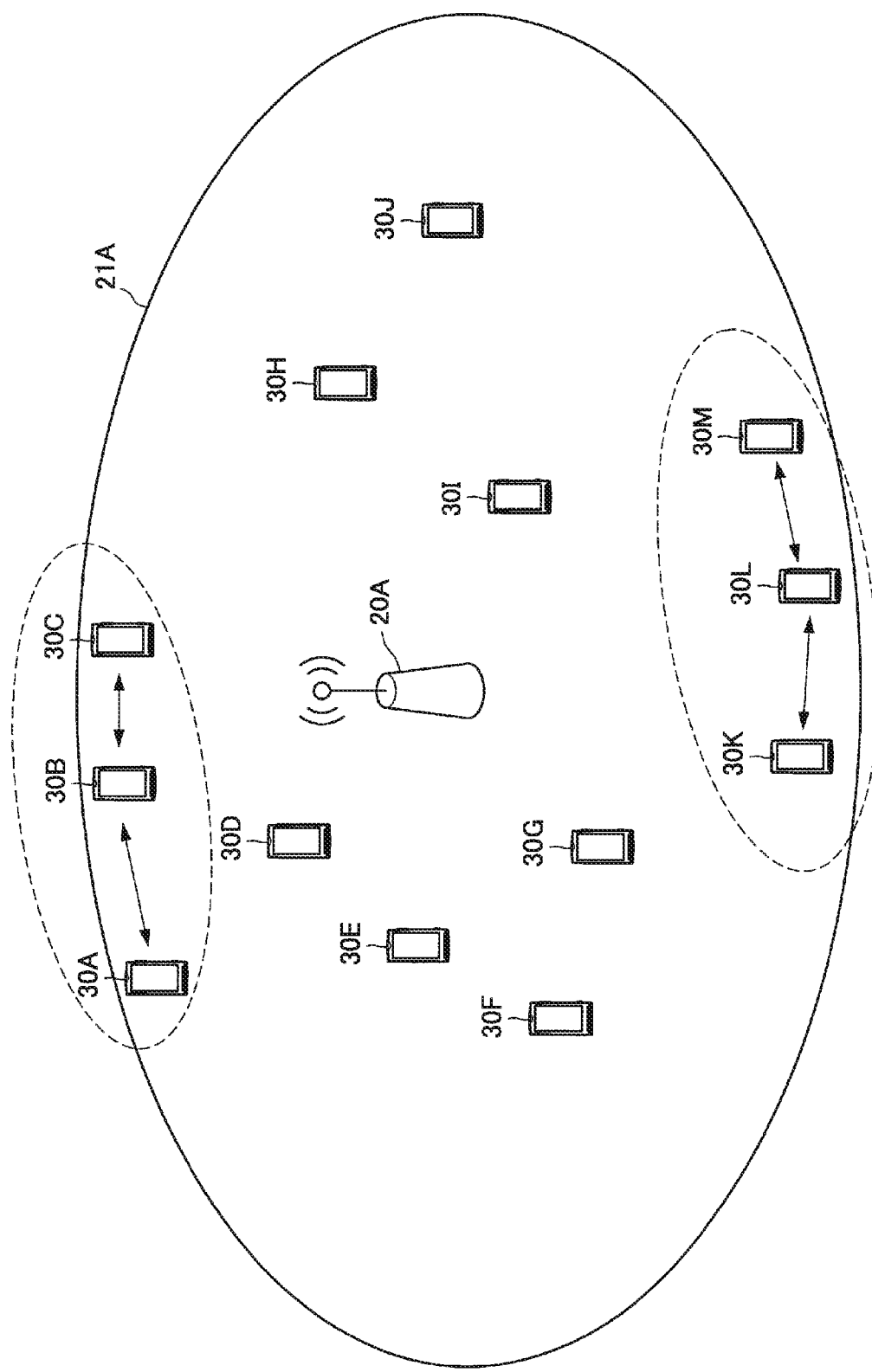
FIG. 4 is a diagram illustrated to describe an example of a wireless communication device operating as a base station.

FIG. 4 is a diagram illustrated to describe an example of a wireless communication device 30 operating as a base station. Referring to FIG. 4, wireless communication devices 30B and 30L are selected as the wireless communication device 30 to operate as a base station, as described with reference again to FIG. 3. Then, the wireless communication devices 30B and 30L start the operation as a base station. Subsequently, the handover of the wireless communication devices 30A and 30C operating as a mobile station to the wireless communication device 30B is performed, and the wireless communication device 30B perform wireless communication with the wireless communication devices 30A and 30C. The handover of the wireless communication devices 30K and 30M operating as a mobile station to the wireless communication device 30L is performed, and the wireless communication device 30L perform wireless communication with the wireless communication devices 30K and 30M.

1.4. Processing Procedure

Figure 5:
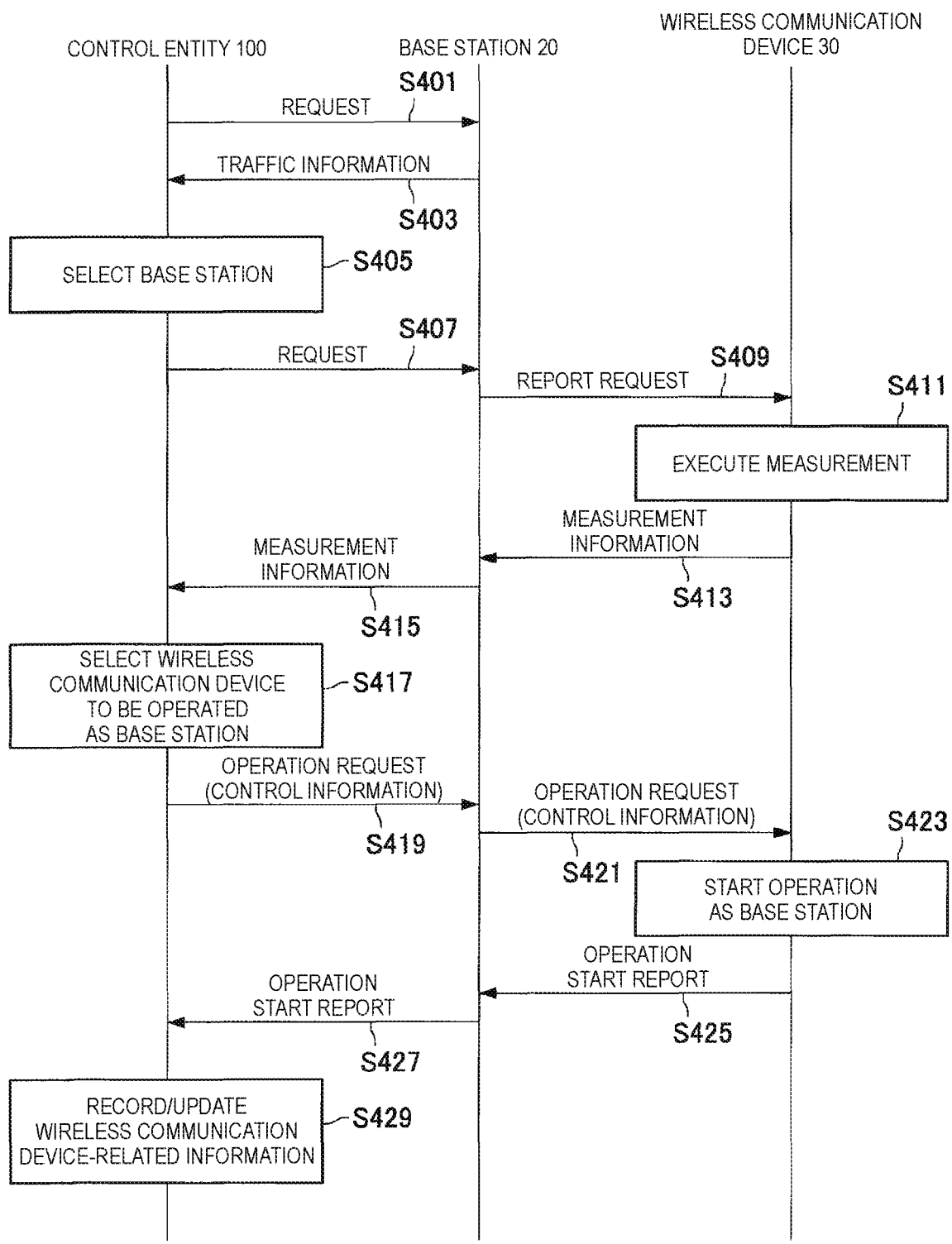
FIG. 5 is a flowchart illustrating an exemplary schematic procedure of a process according to the first embodiment.

An exemplary process according to the first embodiment is now described with reference to FIG. 5. FIG. 5 is a flowchart illustrating an exemplary schematic procedure of a process according to the first embodiment.

The control entity 100 requests the information relating to traffic of the base station 20 from one or more of the base stations 20 (S401), and each of one or more base stations 20 provides the traffic information for the control entity 100 (S403).

The control entity 100 selects a base station 20 from among the one or more base stations 20 based on the traffic information (S405).

The control entity 100 requests the selected base station 20 to request the measurement information from one or more wireless communication devices 30 located in a communication area of the selected base station 20 (S407).

The selected base station 20 requests one or more wireless communication devices 30 located in its own communication area to report the measurement information (S409). Then, the one or more wireless communication devices 30 execute the measurement (S411) and report measurement information indicating the measurement result to the base station 20 (S413).

The selected base station 20 provides the control entity 100 with the measurement information for each of the one or more wireless communication devices 30 (S415).

The control entity 100 selects a wireless communication device 30 to operate as a base station from among the one or more wireless communication devices 30 based on the measurement information for each of the one or more wireless communication devices 30 (S417).

The control entity 100 requests the selected wireless communication device 30 to operate as a base station (S419 and S421). In one example, the control entity 100) transmits the control information for requesting it to operate as a base station (e.g., an operation request message) to the selected wireless communication device 30 via the selected base station 20.

The selected wireless communication device 30 starts the operation as a base station (S423). Furthermore, the selected wireless communication device 30 reports that the operation as a base station is started (S425 and S427). The selected wireless communication device 30 provides information relating to the selected wireless communication device 30 (i.e., the wireless communication device-related information) at the time of reporting.

Then, the control entity 100 records or updates the wireless communication device-related information (S429).

The schematic procedure of the process according to the first embodiment has been described. The position-related information may be certainly used instead of the measurement information. The connected device information may be used instead of the traffic information.

1.5. Modification

The modification of the first embodiment is now described. The control entity 100 performs control for causing the selected wireless communication device 30 to stop the operation as a base station (referred to as "stop control" hereinafter).

(Second Controller 137)

(c) Stop Control

In the modification of the first embodiment, the second controller 137 performs control for causing the selected wireless communication device 30 to stop the operation as a base station (referred to as "stop control" hereinafter).

(c-1) Stop Control

In one example, the stop control includes controlling a stop request to the selected wireless communication device 30.

Request from Control Entity

In the first example, the control entity 100 requests the selected wireless communication device 30 to stop the operation as a base station. In this case, in one example, the second controller 137 generates control information for requesting it to stop the operation as a base station (e.g., a stop request message). Then, the second controller 137 transmits the control information (e.g., the stop request message) to the selected wireless communication device 30 via the communication unit 110 (via the base station 20). In one example, the second controller 137 performs the NAS signaling to the selected wireless communication device 30. In this way, in one example, the second controller 137 controls a request from the control entity 100.

Request from Base Station

In the second example, the base station 20 (the base station 20 of the cell in which the selected wireless communication device 30 is located (i.e., the selected base station 20)) may request the selected wireless communication device 30 to stop the operation as a base station. In this case, the second controller 137 may request the base station 20 to transmit the control information for requesting it to stop the operation as a base station (e.g., the stop request message) to the selected wireless communication device 30. Then, the base station 20 may request the selected wireless communication device 30 to stop the operation as a base station, for example, by the RRC signaling. In this way, the second controller 137 may control a request from the base station 20, in one example.

As described above, the selected wireless communication device 30 is requested to stop the operation as a base station. The selected wireless communication device 30 performs a handover of another wireless communication device 30 connected to the selected wireless communication device 30 before the operation as a base station is stopped. Then, the selected wireless communication device 30 stops the operation as a base station after the handover is completed. The handover may be performed in response to a stop request from the control entity 100 or may be performed in response to another request from the control entity 100 (e.g., a request for handover).

(c-2) Stop Condition

Case where there is Request from Selected Wireless Communication Device 30

In the first example, the second controller 137 performs the stop control in response to a request from the selected wireless communication device 30.

In one example, the selected wireless communication device 30 transmits a message for requesting it to stop the operation as a base station to the control entity 100. Then, the second controller 137 performs the stop control.

This makes it possible to satisfy a desire of the user of the wireless communication device 30, in one example.

Case where Selected Wireless Communication Device 30 is Located Outside Target Area In the second example, the second controller 137 may perform the stop control when the selected wireless communication device 30 is located outside a target area.

In one example, the target area may be a cell in which the selected wireless communication device 30 is located (i.e., a cell of the selected base station 20). In other words, when the selected wireless communication device 30 is moved outside the cell, the second controller 137 may perform the stop control. In another example, when a frequency band that can be used for wireless communication with a mobile station by the selected wireless communication device 30 is allowed to the selected wireless communication device 30 on condition that it is used in a particular area, the target area may be the particular area. The target area is not limited thereto.

In one example, the second controller 137 may acquire information indicating the position of the selected wireless communication device 30 and may determine whether the selected wireless communication device 30 is located outside the target area base on the acquired position.

The first embodiment has been described. According to the first embodiment, the control entity 100 selects a wireless communication device 30 that is to operate as a base station from among one or more wireless communication devices 30, based on the measurement information or the position-related information for each of the one or more wireless communication devices 30 that are capable of operating as both a mobile station and a base station. This makes it possible to achieve flexible traffic offloading in the cell, in one example. More specifically, it is possible for a wireless communication device 30 located in the cell edge or a desired area from among one or more wireless communication devices 30 to operate as a base station, if necessary. It is possible for another wireless communication device 30 located in the cell edge or a desired area to perform communication through the wireless communication device 30 operating as a base station. Consequently, the traffic of the other wireless communication device 30 located in the edge cell or the desired area can be offloaded.

2. SECOND EMBODIMENT

Next, a second embodiment of the present disclosure is now described.

In the first embodiment described above, the control entity 100 selects a wireless communication device 30 to operate as a base station from among one or more wireless communication devices 30, based on the measurement information or the position-related information for each of the one or more wireless communication devices 30 that are capable of operating as both a mobile station and a base station.

On the other hand, in the second embodiment, the base station 20 selects a wireless communication device 30 to operate as a base station from among one or more wireless communication devices 30, based on the measurement information or the position-related information for each of the one or more wireless communication devices 30 that are capable of operating as both a mobile station and a base station.

2.1. Configuration of Communication System

Figure 6:
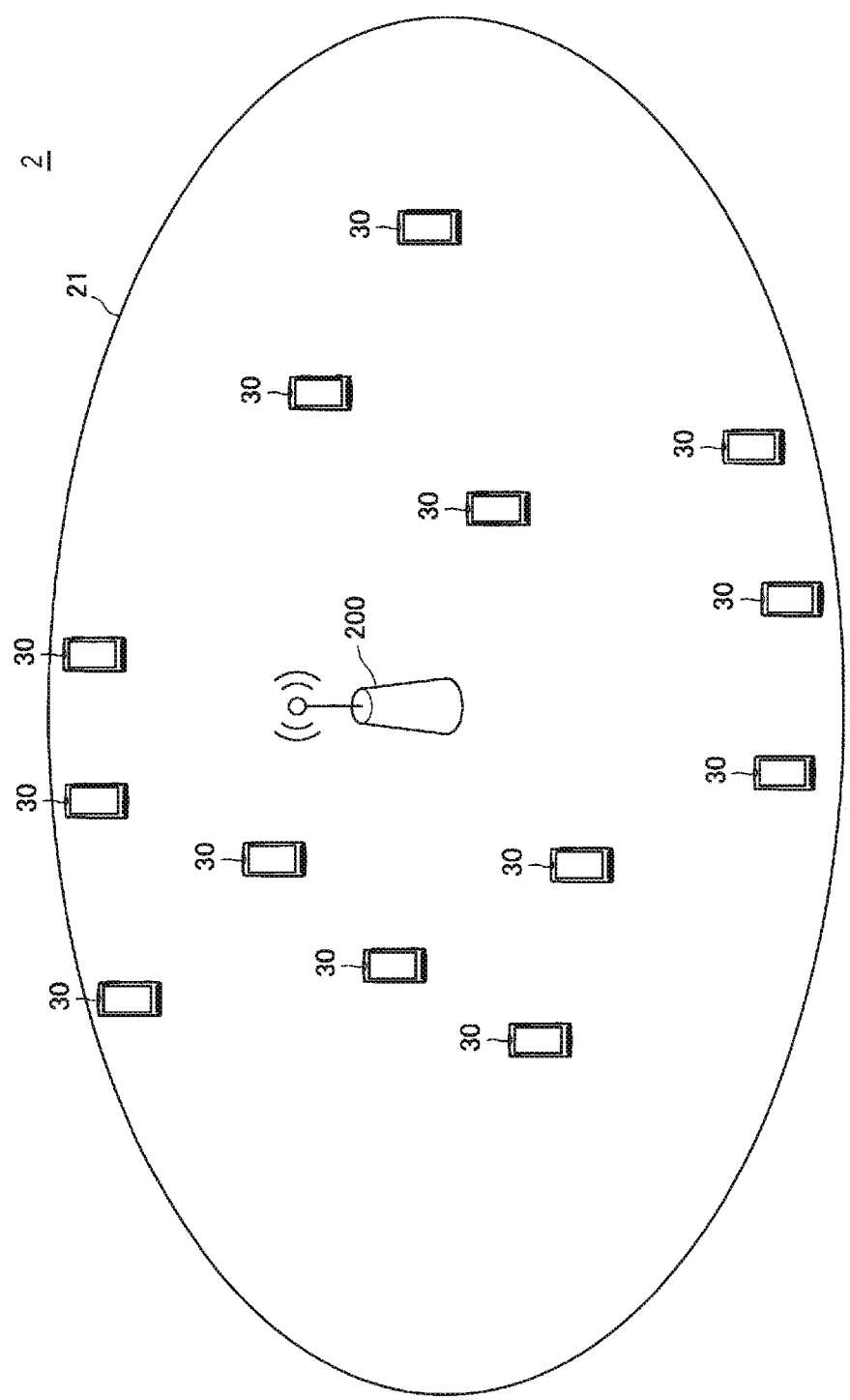
FIG. 6 is a diagram illustrated to describe an exemplary schematic configuration of a communication system according to a second embodiment.

A schematic configuration of a communication system 2 according to the second embodiment is now described with reference to FIG. 6. FIG. 6 is a diagram illustrated to describe an exemplary schematic configuration of the communication system 2 according to the second embodiment. Referring to FIG. 6, the communication system 2 includes a base station 200 and a wireless communication device 30.

(Wireless Communication Device 30)

The wireless communication device 30 is capable of operating as both a mobile station and a base station.

In one example, the wireless communication device 30 operates as a mobile station. In one example, the wireless communication device 30 performs wireless communication with the base station 200. More specifically, in one example, the wireless communication device 30, when being located in the cell 21 of the base station 200, performs wireless communication with the base station 200.

In one example, the wireless communication device 30 operates as a base station. In one example, the wireless communication device 30 performs wireless communication with other wireless communication devices (e.g., another wireless communication device 30). More specifically, in one example, the wireless communication device 30 performs wireless communication with another wireless communication device located in a communication area of the wireless communication device 30.

(Base Station 200)

The base station 200 performs wireless communication with the wireless communication device 30. In one example, the base station 200 performs wireless communication with the wireless communication device 30 located in the cell 21 that is a communication area of the base station 200. In one example, the cell 21 is a macro cell, and the base station 200 is a base station in the macro cell. Alternatively, the cell 21 may be a small cell, and the base station 200 may be a base station in the small cell.

In the second embodiment, the base station 200 selects a wireless communication device 30 to operate as a base station. In particular, the base station 200 selects the wireless communication device 30 to operate as a base station, based on measurement information that indicates a result of measurement for a cell by one or more wireless communication devices 30 or position-related information that is related to the position of one or more wireless communication devices 30.

In one example, the base station 200 performs control for operating the selected wireless communication device 30 as a base station.

The communication system 2 according to the second embodiment has been described. The communication system 2 may further include a wireless communication device that is capable of operating only as a mobile station as well as the wireless communication device 30 that is capable of operating as a mobile station and a base station.

2.2. Configuration of Base Station

Figure 7:
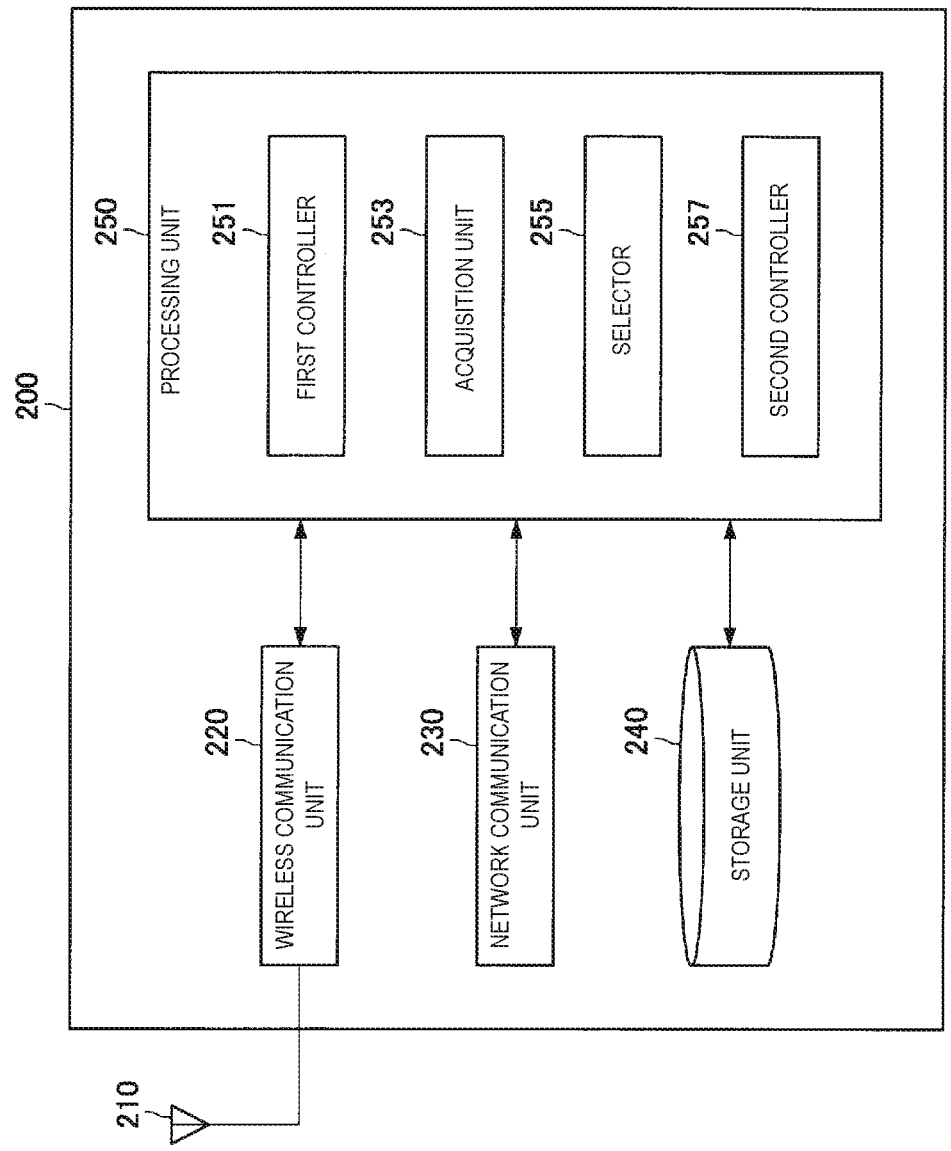
FIG. 7 is a block diagram illustrating an exemplary configuration of a base station according to the second embodiment.

An exemplary configuration of the base station 200 according to the second embodiment is now described with reference to FIG. 7. FIG. 7 is a block diagram illustrating an exemplary configuration of the base station 200 according to the second embodiment. Referring to FIG. 7, the base station 200 is configured to include an antenna unit 210, a wireless communication unit 220, a network communication unit 230, a storage unit 240, and a processing unit 250.
(Antenna Unit 210)

The antenna unit 210 radiates a signal outputted by the wireless communication unit 220 into space as a radio wave. The antenna unit 210 converts a radio wave in space to a signal and outputs the signal to the wireless communication unit 220.
(Wireless Communication Unit 220)

The wireless communication unit 220 transmits and receives a signal. In one example, the wireless communication unit 220 transmits a downlink signal to the wireless communication device 30 located in the cell 21 and receives an uplink signal from the wireless communication device 30 located in the cell 21.
(Network Communication Unit 230)

The network communication unit 230 transmits information to another node and receives information from another node. In one example, the other node includes another base station and core network node.
(Storage Unit 240)

The storage unit 240 stores a program and data used for the operation of the base station 200 on a temporary or permanent basis.
(Processing Unit 250)

The processing unit 250 enables the base station 200 to perform various functions. The processing unit 250 is configured to include a first controller 251, an acquisition unit 253, a selector 255, and a second controller 257. The processing unit 250 may further include a component other than these components. In other words, the processing unit 250 may also perform an operation other than operations of these components.
(First Controller 251)

The first controller 251 controls a request to one or more wireless communication devices 30 for a report on the measurement information or the position-related information.

(a) Measurement Information/Position-Related Information

There is no difference in the description of the measurement information and the position-related information between the first embodiment and the second embodiment. Thus, a repeated description will be omitted.

(b) One or More Wireless Communication Devices (b-1) Wireless Communication Device Located in Communication Area of Base Station In one example, the one or more wireless communication devices 30 are the wireless communication device 30 located in the communication area of the base station 200.

(b-2) Wireless Communication Device in Idle State

In one example, the one or more wireless communication devices 30 are the wireless communication device 30 that is in the idle state. More specifically, in one example, the one or more wireless communication devices 30 are the wireless communication device 30 that is in the RRC idle state.

This makes it possible to collect the measurement information or the position-related information from the wireless communication device 30 that does not perform transmission or reception of data, in one example. Thus, the wireless communication device 30 that does not perform transmission or reception of data is allowed to operate as a base station. In other words, the traffic offloading can be performed without interfering with the transmission of data by the wireless communication device 30.

(b-3) Wireless Communication Device Having Low Mobility

The one or more wireless communication devices 30 may be the wireless communication device 30 having low mobility.

In one example, the first controller 251 may acquire information relating to the mobility of a plurality of wireless communication devices 30, and may select one or more wireless communication devices 30 having low mobility from among the plurality of wireless communication devices 30 as a target to be requested.

This makes it possible to operate the wireless communication device 30 that is more suitable for beam forming as a base station, in one example. Thus, the wireless communication device 30 that is more suitable for beam forming can operate as a base station. Thus, the wireless backhaul may be implemented by beam forming. The wireless communication device 30 that is located in a desired area in a long time may operate as a base station.

(c) Example of Control

In one example, the first controller 251 requests the one or more wireless communication devices 30 to report the measurement information or the position-related information. More specifically, in one example, the first controller 251 generates control information for requesting a report on the measurement information or the position-related information (e.g., a report request message). Then, the first controller 251 transmits the control information to the one or more wireless communication devices 30 via the antenna unit 210 and the wireless communication unit 220.

In one example, the control information is an RRC connection reconfiguration message, and it includes measurement configuration.

(d) Multicast/Broadcast

The request may be a request using multicast or broadcast.

In one example, the base station 200 may distribute the control information for requesting a report on the measurement information or the position-related information to the one or more wireless communication devices 30 (or the wireless communication device 30 including the one or more wireless communication devices) using multicast. Alternatively, the base station 200 may distribute the control information for requesting a report on the measurement information or the position-related information (e.g., among system information items) using broadcast.

This allows a request to the one or more wireless communication devices 30 to be performed more efficiently, in one example.

In general, the core network node can recognize the position of a wireless communication device that is in a connected state (e.g., in the RRC connected state) in units of cells (i.e., in units of base stations). On the other hand, the core network node can recognize the position of a wireless communication device that is in an idle state (e.g., in the RRC idle state) only in units of tracking areas (or local areas). Thus, the base station 200 that requests for a report by using multicast allows a wireless communication device located in the communication area (i.e., the cell 21) of the base station 200 to be requested for reporting.

(e) Conditional Report

The first controller 251 may control a request to the wireless communication device 30 including the one or more wireless communication devices 30 for a report on the measurement information or the position-related information. The report may be a report that is performed by the wireless communication device 30 that satisfies a report condition. The one or more wireless communication devices 30 may be the wireless communication device 30 that satisfies the report condition.

(e-1) Notification of Report Condition

In one example, when the request to the wireless communication device 30 including the one or more wireless communication devices 30 is performed, the report condition may be notified to the wireless communication device 30 by the base station 200. Each of the wireless communication devices 30 may report the measurement information or the position-related information when the report condition is satisfied.

(e-2) Example of Report Condition

There is no difference in the description of an example of the report condition between the first embodiment and the second embodiment. Thus, a repeated description will be omitted.

(f) Trigger

In one example, the processing unit 250 (e.g., the first controller 251) determines whether to operate the wireless communication device 30 as a base station, based on information relating to the base station 200 (referred to as "base station-related information" hereinafter). Then, if it is determined by the processing unit 250 (e.g., the first controller 251) to operate the wireless communication device 30 as a base station, the first controller 251 requests the one or more wireless communication devices 30 to report the measurement information or the position-related information.

(f-1) First Example: Traffic Information

In one example, the base station-related information is information relating to traffic of the base station 200 (referred to as "traffic information" hereinafter). In other words, the processing unit 250 (e.g., the first controller 251) determines whether to operate the wireless communication device 30 as a base station based on the traffic information.

In one example, the traffic may be traffic that is processed previously by the base station 200. Alternatively, the traffic may be traffic that is intended to be processed later by the base station 200.

In one example, the traffic information is information indicating the amount of traffic (e.g., total amount, average value, etc.) that is processed previously by the base station 200. In another example, it may be information that indicates the history of the amount of traffic processed previously by the base station 200. The traffic information may be information pertaining to the number of control information items that are processed previously by the base station 200 or that are assumed to be processed later.

(f-2) Second Example: Connected Device Information

The base station-related information may be information relating to a wireless communication device that is connected to the base station 200 (referred to as "connected device information" hereinafter). In other words, the processing unit 250 (e.g., the first controller 251) determines whether to operate the wireless communication device 30 as a base station based on the connected device information.

In one example, the connected device information is information indicating the number of wireless communication devices that are connected to the base station 200 (referred to as "connection count" hereinafter). The wireless communication device may be the wireless communication device 30 that is capable of operating as a mobile station and a base station, or may include the wireless communication device 30 and another wireless communication device (wireless communication device operable only as a mobile station).

The connection count may be the number of wireless communication devices (e.g., a wireless communication device in which the received power (e.g., RSRP) of RS transmitted by the base station 200 is less than a threshold) that are located at the edge of the cell 21 of the base station 200. Alternatively, the connected device information may be information indicating the proportion (referred to as "connection proportion") of wireless communication devices located at the edge of the cell 21 of the base station 200 (e.g., wireless communication device in which the received power (e.g., RSRP) of RS transmitted by the base station 200 is less than a threshold) to the wireless communication devices connected to the base station 200. This makes it possible to recognize whether the base station 200 is difficult to obtain the effect of link adaptation, in one example. The threshold may be updated dynamically.

(Acquisition Unit 253)

The acquisition unit 253 acquires measurement information (information indicating a result of measurement for a cell by the wireless communication device 30) or position-related information (information relating to the position of the wireless communication device 30) for each of the one or more wireless communication devices 30.

As described above, the base station 200 requests the one or more wireless communication devices 30 to report the measurement information or the position-related information, in one example. Then, each of the one or more wireless communication devices 30 reports the measurement information or the position-related information to the base station 200. Then, the measurement information or the position-related information for each of the one or more wireless communication devices 30 is stored in the storage unit 240. The acquisition unit 253 acquires the measurement information or the position-related information in any subsequent time.

(Selector 255)

The selector 255 selects the wireless communication device 30 that is to operate as a base station among from the one or more wireless communication devices 30 based on the measurement information or the position-related information for each of the one or more wireless communication devices 30.

There is no difference in the description of this point between the first embodiment and the second embodiment except for difference in numerals and targets concerned and addition of the following characteristics. Thus, a repeated description will be omitted.

(g) Selection Based on Type of Backhaul Line of Base Station 200

The selector 255 may select the wireless communication device 30 to operate as a base station, based on the type of backhaul of the base station 200 (i.e., backhaul between the base station 200 and the core network).

In the first case, the backhaul may be the wired backhaul. In this case, the selector 255 may select more number of wireless communication devices 30 to operate as a base station. In the second case, the backhaul may include the wireless backhaul. In this case, the selector 255 may select fewer number of wireless communication devices 30 to operate as a base station.

(Second Controller 257)

(a) Control for Operation as Base Station

The second controller 257 performs control for operating the selected wireless communication device 30 as a base station (referred to as "control for operation as base station" hereinafter). This allows the selected wireless communication device 30 to operate as a base station actually, in one example. An example of the control for operation as base station will be described in more detail later.

(b) Management of Information Relating to Wireless Communication Device Operating as Base Station In one example, the second controller 257 manages information relating to the wireless communication device 30 operating as a base station (wireless communication device-related information).

(b-1) Example of Wireless Communication Device-Related Information

There is no difference in the description of an example of the wireless communication device-related information between the first embodiment and the second embodiment. Thus, a repeated description will be omitted.

(b-2) Example of Management

In one example, the second controller 257 performs recording and updating of the wireless communication device-related information.

There is no difference in the description of this point between the first embodiment and the second embodiment except for difference in numerals and targets concerned. Thus, a repeated description will be omitted.

2.3. Control for Operating Wireless Communication Device as Base Station

An example of control for operating the selected wireless communication device 30 as a base station (i.e., the control for operation as base station) is now described.

First Control Example: Request for Operation as Base Station

In one example, the control for operation as base station includes controlling a request for causing the selected wireless communication device 30 to operate as a base station.

In one example, the second controller 257 generates control information for a request for an operation as a base station (e.g., an operation request message). Then, the second controller 257 transmits the control information (e.g., the operation request message) to the one or more wireless communication devices 30 via the antenna unit 210 and the wireless communication unit 220. In one example, the second controller 257 transmits the control information to the selected wireless communication device 30 using the RRC signaling.

When the wireless communication device 30 that is in the idle state is selected as the wireless communication device to operate as a base station, the wireless communication device 30 that is in the idle state becomes in the connected state by paging or the like before transmission of the control information, in one example.

Second Control Example: Provision of Information

In one example, the control for operation as base station includes providing information for the selected wireless communication device 30.

(a) Example of Information to be Provided

There is no difference in the description of the information provided for the selected wireless communication device 30 between the first embodiment and the second embodiment. Thus, a repeated description will be omitted.

(b) Provision of Information

In the first example, the second controller 257 provides the control information for the selected wireless communication device 30 using the RRC signaling.

Third Control Example: Control for Handover

In one example, the control for operation as base station includes control for a handover to the selected wireless communication device 30.

(a) First Example

In the first example, the second controller 257 determines a handover (of an adjacent wireless communication device operating as a mobile station) to the selected wireless communication device 30. Then, the second controller 257 performs the handover. This makes it possible to offload the traffic of the base station 200, in one example.

(b) Second Example

In the second example, the second controller 257 may add a cell of the selected wireless communication device 30 to a neighbor cell list. Furthermore, the second controller 257 may request another base station that is adjacent to the selected wireless communication device 30 to add a cell of the selected wireless communication device 30 to a neighbor cell list. This allows another wireless communication device to perform a measurement report for the selected wireless communication device 30, in one example. Thus, it is possible to perform the handover to the selected wireless communication device 30. Consequently, it is possible to offload the traffic of the base station 200.

When the operation as a base station by the selected wireless communication device 30 is stopped, the cell of the selected wireless communication device 30 may be deleted from the neighbor cell list. Furthermore, the second controller 257 may request a base station that is adjacent to the selected wireless communication device 30 to delete the cell of the selected wireless communication device 30 from the neighbor cell list.

(c) Third Example

In the third example, the second controller 257 may change a parameter relating to the measurement. Furthermore, the second controller 257 may request a base station that is adjacent to the selected wireless communication device 30 to change a parameter relating to the measurement. The parameter may be determined so that the cell of the selected wireless communication device 30 is selected with more ease.

The parameter may include a threshold and/or offset for an event of measurement report. The parameter may include a variable relating to S-criterion for cell selection/cell-reselection. The parameter may include the transmitted power of the reference signal.

2.4. Processing Procedure

Figure 8:
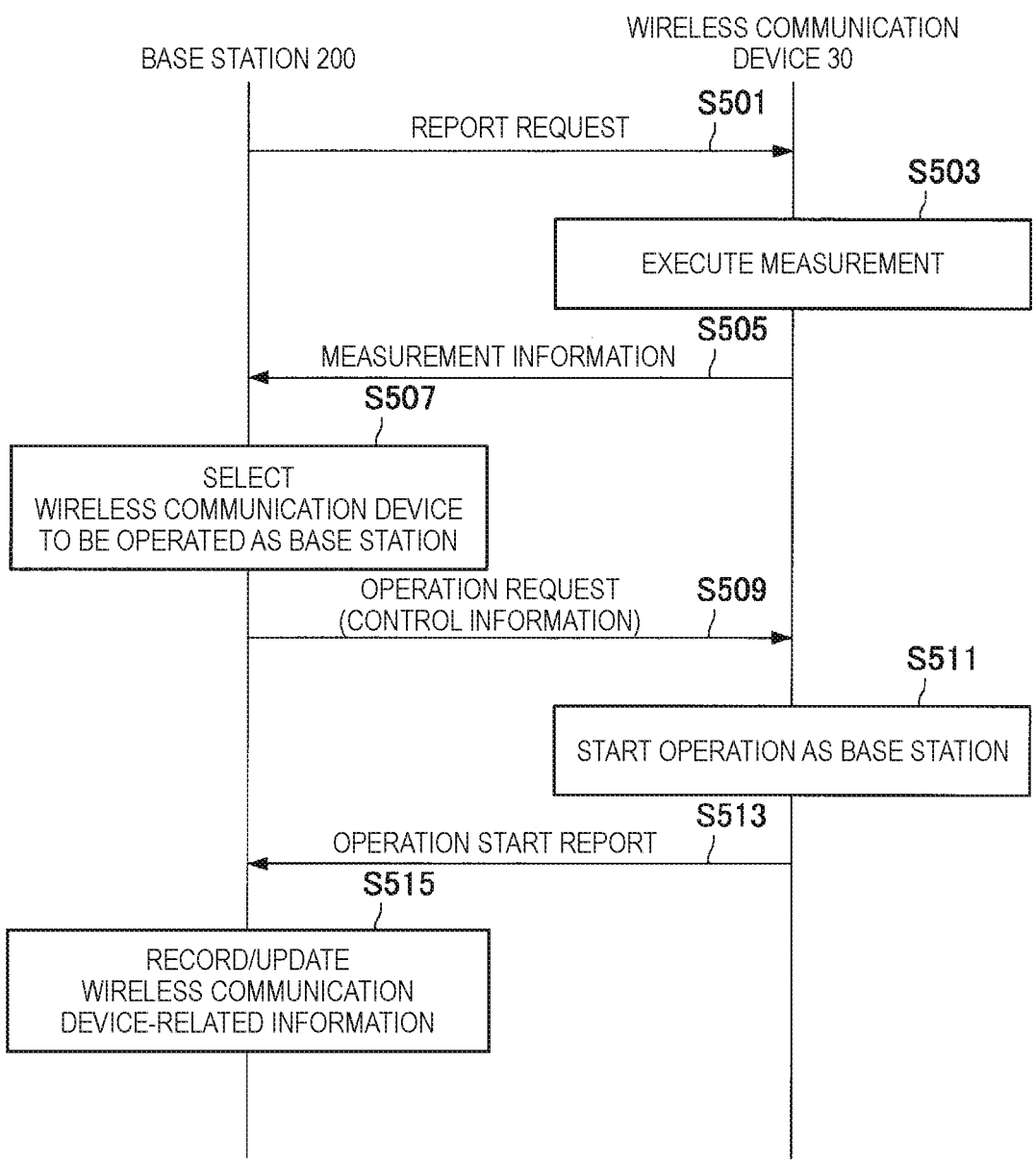
FIG. 8 is a flowchart illustrating an exemplary schematic procedure of a process according to the second embodiment.

An exemplary process according to the second embodiment is now described with reference to FIG. 8. FIG. 8 is a flowchart illustrating an exemplary schematic procedure of a process according to the second embodiment.

The base station 200 requests one or more wireless communication devices 30 located in its own communication area (cell 21) to report the measurement information (S501). Then, the one or more wireless communication devices 30 execute the measurement (S503) and report measurement information indicating the measurement result to the base station 200 (S505).

The base station 200 selects the wireless communication device 30 to operate as a base station from among the one or more wireless communication devices 30 based on the measurement information for each of the one or more wireless communication devices 30 (S507).

The base station 200 requests the selected wireless communication device 30 to operate as a base station (S509). In one example, the base station 200 transmits control information for requesting it to operate as a base station (e.g., an operation request message) to the selected wireless communication device 30.

The selected wireless communication device 30 starts the operation as a base station (S511). Furthermore, the selected wireless communication device 30 reports that the operation as a base station is started (S513). The selected wireless communication device 30 provides information relating to the selected wireless communication device 30 (i.e., wireless communication device-related information) at the time of reporting.

Then, the base station 200 records or updates the wireless communication device-related information (S515).

The schematic procedure of the process according to the second embodiment has been described. The position-related information may be certainly used instead of the measurement information.

2.5. Modification

The modification of the second embodiment is now described. The base station 200 performs control for causing the selected wireless communication device 30 to stop the operation as a base station (referred to as "stop control" hereinafter).

(c-1) Stop Control

In one example, the stop control includes controlling a request for causing the selected wireless communication device 30 to stop its operation.

In one example, the second controller 257 generates control information for requesting it to stop the operation as a base station (e.g., a stop request message). Then, the second controller 257 transmits the control information (e.g., the stop request message) to the selected wireless communication device 30 via the antenna unit 210 and the wireless communication unit 220. In one example, the second controller 257 transmits the control information by the RRC signaling to the selected wireless communication device 30.

As described above, the selected wireless communication device 30 is requested to stop the operation as a base station. The selected wireless communication device 30 performs a handover of another wireless communication device 30 connected to the selected wireless communication device 30 before the operation as a base station is stopped. Then, the selected wireless communication device 30 stops the operation as a base station after the handover is completed. The handover may be performed in response to a stop request from the base station 200 or may be performed in response to another request from the base station 200 (e.g., a request for handover).

(c-2) Stop Condition

There is no difference in the description of the condition of the stop control between the first embodiment and the second embodiment except for difference in numerals and targets concerned. Thus, a repeated description will be omitted.

The second embodiment has been described. According to the second embodiment, the base station 200 selects the wireless communication device 30 to operate as a base station from among one or more wireless communication devices 30 based on the measurement information or the position-related information for each of the one or more wireless communication devices 30 that are capable of operating as a mobile station and a base station. This makes it possible to achieve flexible traffic offloading in the cell, in one example.

3. APPLICATION EXAMPLES

The technology according to the present disclosure is applicable to various products. In one example, the control entity 100 may be implemented as any type of server such as a tower server, rack server, and blade server. In addition, at least a part of constituent elements of the control entity 100 may be implemented in a module (e.g., an integrated circuit module configured in one die, or a card or blade inserted into a slot of a blade server) mounted in a server.

In one example, the base station 200 may be implemented as any type of evolved Node B (eNB) such as a macro eNB and a small eNB. A small eNB may be an eNB that covers a cell smaller than a macrocell, such as a pico eNB, a micro eNB, and a home (femto) eNB. Instead, the base station 200 may be implemented as another type of base station such as a NodeB and a base transceiver station (BTS). The base station 200 may include a main body (that is also referred to as a base station device) configured to control wireless communication and one or more remote radio heads (RRHs) disposed in a different place from the main body. Additionally, various types of terminals, which will be described later, may also operate as the base station 200 by temporarily or semi-permanently executing functions of a base station. Furthermore, at least a part of constituent elements of the base station 200 may be implemented in a base station device or in a module for a base station device.

3.1. Application Example Relating to Control Entity

Figure 9:
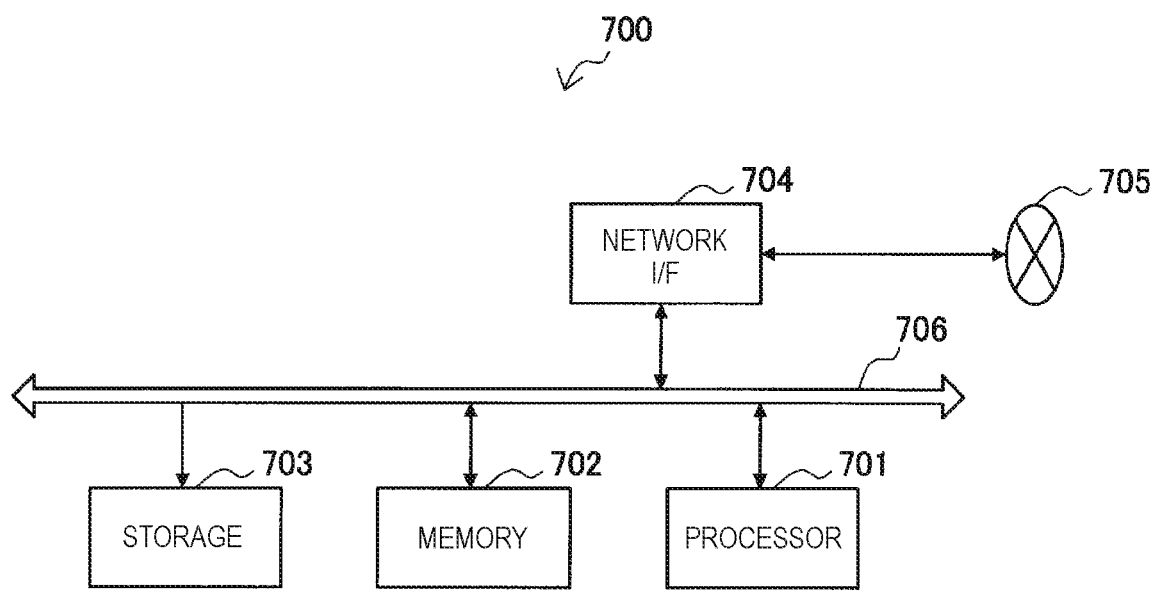
FIG. 9 is a block diagram illustrating an exemplary schematic configuration of a server.

FIG. 9 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be a central processing unit (CPU) or a digital signal processor (DSP) in one example, and controls various types of functions of the server 700. The memory 702 includes random access memory (RAM) and read only memory (ROM), and stores programs executed by the processor 701 or other data. The storage 703 may include a storage medium such as a semiconductor memory and a hard disk.

The network interface 704 is a wired communication interface used to connect the server 700 to a wired communication network 705. The wired communication network 705 may be a core network such as an Evolved Packet Core (EPC), or may be a packet data network (PDN) such as the Internet.

The bus 706 connects the processor 701, the memory 702, the storage 703, and the network interface 704 to each other.

The bus 706 may include two or more buses (such as a high-speed bus and a low-speed bus) each of which has different speed.

One or more constituent elements (the first acquisition unit 131, the first selector 132, the first controller 133, the second acquisition unit 135, the second selector 136, and/or the second controller 137) included in the processing unit 130 described with reference to FIG. 2 may be incorporated in the processor 701 of the server 700 shown in FIG. 9. As an example, a program for causing the processor to function as the above-mentioned one or more constituent elements (i.e., a program for causing the processor to execute operations of the above-mentioned one or more constituent elements) may be installed in the server 700, and the processor 701 may execute the program. In another example, the server 700 may have a module that includes the processor 701 and the memory 702 to incorporate the above-mentioned one or more constituent elements in the module. In this case, the module may store a program for causing the processor to function as the above-mentioned one or more constituent elements in the memory 702, and the processor 701 may execute the program. As described above, the server 700 or the module may be provided as a device that includes the above-mentioned one or more constituent elements, or the program for causing the processor to function as the above-mentioned one or more constituent elements may be provided. In addition, a readable recording medium on which the program is recorded may be provided.

3.2. Application Example Relating to Base Station

First Application Example

Figure 10:
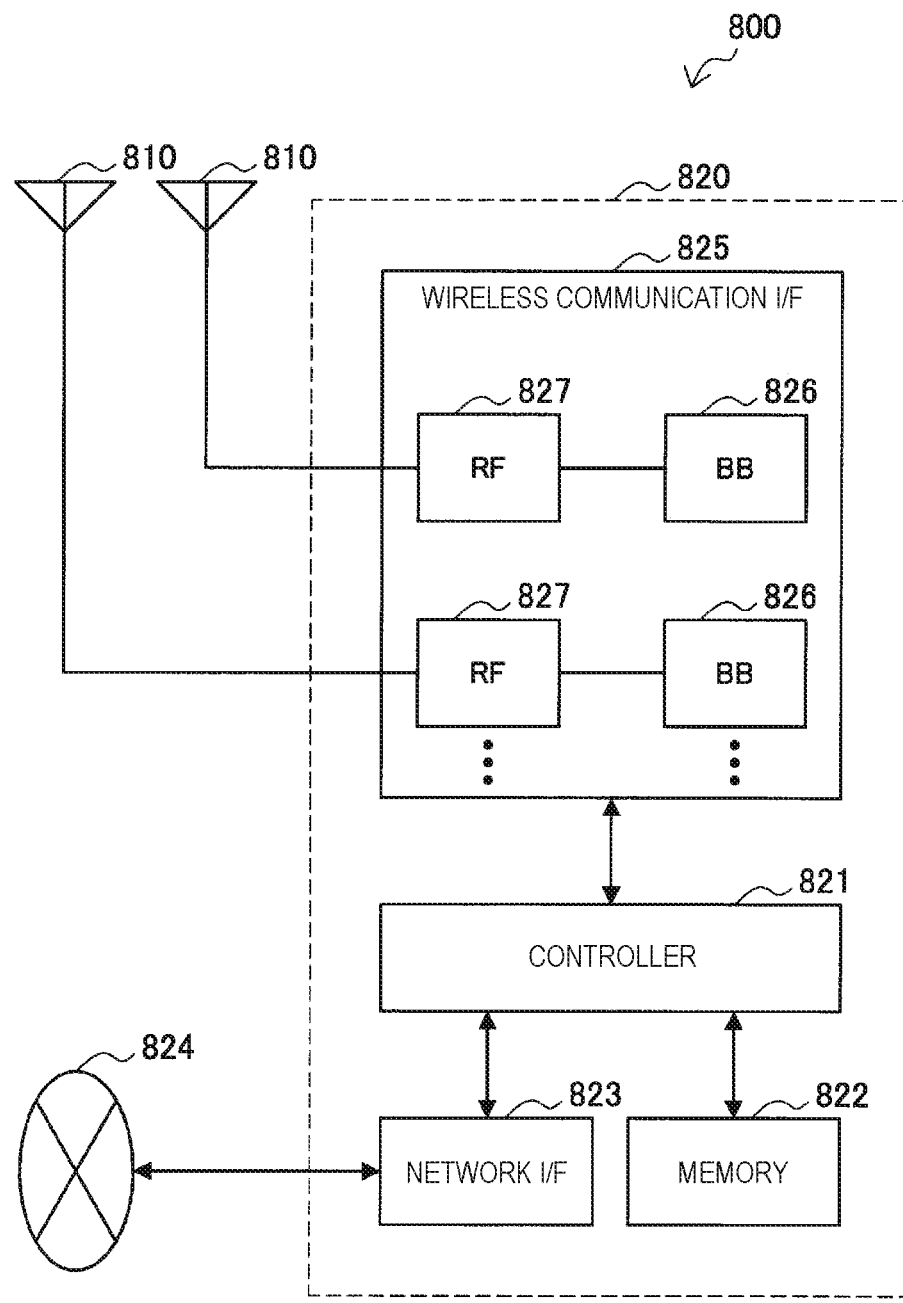
FIG. 10 is a block diagram illustrating a first example of a schematic configuration of eNB.

FIG. 10 is a block diagram illustrating a first example of a schematic configuration of an eNB to which the technology according to the present disclosure may be applied. The eNB 800 includes one or more antennas 810 and a base station device 820. Each antenna 810 and the base station device 820 may be connected to each other via an RF cable.

Each of the antennas 810 includes a single or multiple antenna elements (e.g., multiple antenna elements included in a MIMO antenna), and is used for the base station device 820 to transmit and receive wireless signals. The eNB 800 may include the multiple antennas 810, as illustrated in FIG. 10. In one example, the multiple antennas 810 may be individually compatible with multiple frequency bands used by the eNB 800. Although FIG. 10 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and causes various functions of a higher layer of the base station device 820 to be executed. In one example, the controller 821 generates a data packet from data in signals processed by the wireless communication interface 825, and transfers the generated packet via the network interface 823. The controller 821 may bundle data from multiple baseband processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmitted power data, and scheduling data).

The network interface 823 is a communication interface used to connect the base station device 820 to a core network 824. The controller 821 may communicate with a core network node or another eNB via the network interface 823. In that case, the eNB 800, and the core network node or the other eNB may be connected to each other through a logical interface (e.g., an Si interface and an X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (e.g., L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 10. In one example, the multiple BB processors 826 may be individually compatible with multiple frequency bands used by the eNB 800. The wireless communication interface 825 may include the multiple RF circuits 827, as illustrated in FIG. 10. In one example, the multiple RF circuits 827 may be individually compatible with multiple antenna elements. Although FIG. 10 illustrates the example in which the wireless communication interface 825 includes the multiple BB processors 826 and the multiple RF circuits 827, the wireless communication interface 825 may also include a single BB processor 826 or a single RF circuit 827.

One or more constituent elements of the constituent elements included in the processing unit 250 (the first controller 251, the acquisition unit 253, the selector 255, and/or the second controller 257) described with reference to FIG. 7 may be incorporated in the controller 821 of the eNB 800 shown in FIG. 10. Alternatively, the at least part of these constituent elements may be incorporated in the wireless communication interface 825. As an example, the eNB 800 may have a module that includes a part (e.g., the BB processors 826) or all of the components of the wireless communication interface 825 and/or the controller 821, and the above-described one or more constituent elements may be incorporated in the module. In this case, the module may store a program for causing a processor to function as the above-described one or more constituent elements (i.e., a program for causing a processor to execute operations of the above-described one or more constituent elements) and execute the program. In another example, a program for causing a processor to function as the above-described one or more constituent elements may be installed in the eNB 800 and the wireless communication interface 825 (e.g., the BB processors 826) and/or the controller 821 may execute the program. As described above, the eNB 800, the base station device 820, or the module may be provided as a device that includes the above-described one or more constituent elements, or a program for causing a processor to function as the above-described one or more constituent elements may be provided. In addition, a readable recording medium on which the program is recorded may be provided.

Furthermore, the wireless communication unit 220 described with reference to FIG. 7 may be incorporated in the wireless communication interface 220 (e.g., the RF circuit 827) in the eNB 800 shown in FIG. 10. In addition, the antenna unit 210 may be incorporated in the antenna 810. Furthermore, the network communication unit 230 may be incorporated in the controller 821 and/or the network interface 823.

Second Application Example

Figure 11:
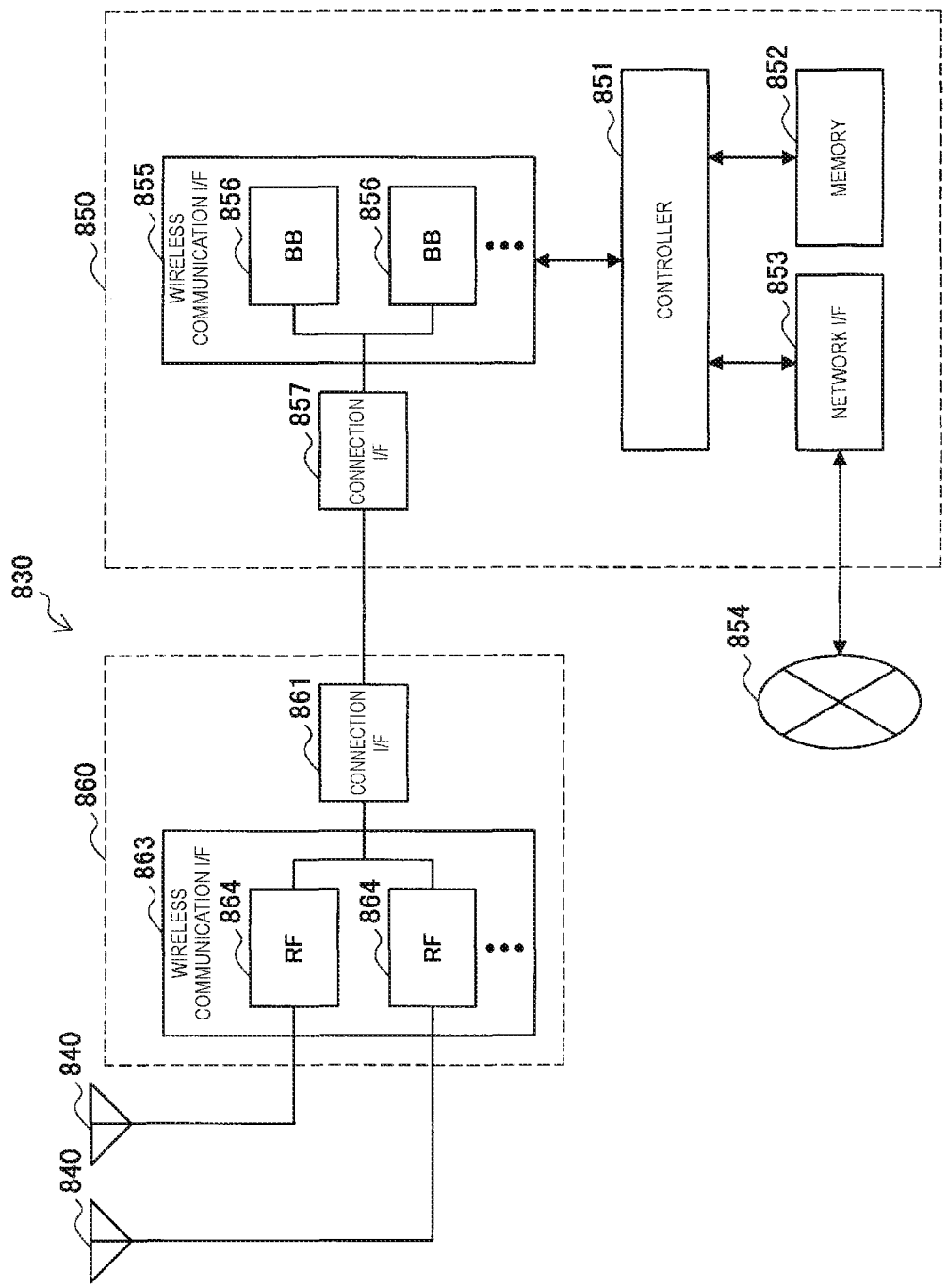
FIG. 11 is a block diagram illustrating a second example of a schematic configuration of eNB.

FIG. 11 is a block diagram illustrating a second example of a schematic configuration of an eNB to which the technology according to the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high-speed line such as an optical fiber cable.

Each of the antennas 840 includes a single or multiple antenna elements (e.g., multiple antenna elements included in a MIMO antenna), and is used for the RRH 860 to transmit and receive wireless signals. The eNB 830 may include the multiple antennas 840, as illustrated in FIG. 11. In one example, the multiple antennas 840 may be individually compatible with multiple frequency bands used by the eNB 830. Although FIG. 11 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 10, respectively.

The wireless communication interface 855 supports any cellular communication scheme such as LTE and LTE-Advanced, and provides wireless connection to a terminal positioned in a sector corresponding to the RRH 860 via the RRH 860 and the antenna 840. The wireless communication interface 855 may typically include, for example, a BB processor 856. The BB processor 856 is similar to the BB processors 826 described with reference to FIG. 10, except that the BB processors 856 are connected to RF circuits 864 of the RRH 860 via the connection interface 857. The wireless communication interface 855 may include the multiple BB processors 856, as shown in FIG. 11. In one example, the multiple BB processors 856 may be individually compatible with multiple frequency bands used by the eNB 830. Although FIG. 11 illustrates the example in which the wireless communication interface 855 includes the multiple BB processors 856, the wireless communication interface 855 may also include a single BB processor 856.

The connection interface 857 is an interface used to connect the base station device 850 (the wireless communication interface 855) to the RRH 860. The connection interface 857 may also be a communication module for communication over the above-described high-speed line that connects the base station device 850 (the wireless communication interface 855) to the RRH 860.

The RRH 860 includes a connection interface 861 and a wireless communication interface 863.

The connection interface 861 is an interface used to connect the RRH 860 (the wireless communication interface 863) to the base station device 850. The connection interface 861 may also be a communication module for communication over the above-described high-speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as shown in FIG. 11. In one example, the multiple RF circuits 864 may support multiple antenna elements individually. Although FIG. 11 illustrates the example in which the wireless communication interface 863 includes the multiple RF circuits 864, the wireless communication interface 863 may also include a single RF circuit 864.

One or more constituent elements included in the processing unit 250 (the first controller 251, the acquisition unit 253, the selector 255, and/or the second controller 257) described with reference to FIG. 7 may be incorporated in the controller 851 of the eNB 830 shown in FIG. 11. Alternatively, the at least part of these constituent elements may be incorporated in the wireless communication interface 855 and/or the wireless communication interface 863. As an example, the eNB 830 may have a module that includes the controller 851 and/or a part or all of the components of the wireless communication interface 855 (e.g., the BB processors 856), and the described-above one or more constituent elements may be incorporated in the module. In this case, the module may store a program for causing a processor to function as the described-above one or more constituent elements (i.e., a program for causing a processor to execute operations of the described-above one or more constituent elements) and execute the program. In another example, a program for causing a processor to function as the described-above one or more constituent elements may be installed in the eNB 830 and the wireless communication interface 855 (e.g., the BB processors 856) and/or the controller 851 may execute the program. As described above, the eNB 830, the base station device 850, or the module may be provided as a device that includes the described-above one or more constituent elements, or a program for causing a processor to function as the described-above one or more constituent elements may be provided. In addition, a readable recording medium on which the program is recorded may be provided.

Furthermore, the wireless communication unit 220 described with reference to FIG. 7 may be incorporated in the wireless communication interface 863 (e.g., the RF circuit 864) in the eNB 830 shown in FIG. 11. In addition, the antenna unit 210 may be incorporated in the antenna 840. Furthermore, the network communication unit 230 may be incorporated in the controller 851 and/or the network interface 853.

4. CONCLUSION

The embodiments of the present disclosure have been described with reference to FIGS. 1 to 11. According to the embodiment of the present disclosure, the control entity 100 or the base station 200 includes the acquisition unit and the selector. The acquisition unit is configured to acquire measurement information indicating a result of measurement for a cell by the wireless communication devices 30 or position-related information relating to the position of the wireless communication device 30, for each of one or more wireless communication devices 30 that are capable of operating as a mobile station and a base station. The selector is configured to select the wireless communication device 30 to operate as a base station from among the one or more wireless communication devices 30 based on the measurement information or the position-related information for each of the one or more wireless communication devices 30. This makes it possible to achieve flexible traffic offloading in the cell, in one example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example in which the base station and wireless communication devices are based on LTE, LTE-Advance, or its equivalent communication standard has been mainly described, the present disclosure is not limited to such an example. For example, the base station and wireless communication devices may be a system based on other communication standards.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program (in other words, a computer program for causing the processor to execute an operation of the components of the above-described apparatus) for allowing a processor (e.g. CPU and DSP, etc.) provided in the apparatus (e.g. the control entity or the module thereof, the base station, or the base station device or the module thereof) in the present specification to function as the components (e.g. one or more constituent elements included in the processing unit) of the above-described apparatus. Further, it is also possible to provide a recording medium having the above-described computer program recorded therein. Further, it is also possible to provide an apparatus (e.g. a finished product and a module (parts, processing circuits and chips, etc.) for the finished product) including a memory having the above-described computer program stored therein and one or more processors which can execute the above-described computer program. Further, a method including the operation of the components of the above-described apparatus is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus including:

an acquisition unit configured to acquire measurement information or position-related information for each of one or more wireless communication devices capable of operating as a mobile station and a base station, the measurement information indicating a result of measurement for a cell by a wireless communication device, the position-related information being related to a position of a wireless communication device; and a selector configured to select a wireless communication device to operate as a base station from among the one or more wireless communication devices based on the measurement information or the position-related information for each of the one or more wireless communication devices.

(2)

The apparatus according to (1), wherein the one or more wireless communication devices are wireless communication devices in an idle state.

(3)

The apparatus according to (1) or (2), further including:

a first controller configured to control a request for a report on the measurement information or the position-related information, the request being given to the one or more wireless communication devices.

(4)

The apparatus according to (3), wherein the request is a request using multicast or broadcast.

(5)

The apparatus according to (3) or (4), wherein the first controller controls a request for a report on the measurement information or the position-related information, the request being given to a wireless communication device including the one or more wireless communication devices, the report is a report performed by a wireless communication device satisfying a report condition, and the one or more wireless communication devices are wireless communication devices satisfying the report condition.

(6)

The apparatus according to any one of (1) to (5), wherein the one or more wireless communication devices or the selected wireless communication device is a wireless communication device having low mobility.

(7)

The apparatus according to any one of (1) to (7), further including:

a second controller configured to perform control for operating the selected wireless communication device as a base station.

(8)

The apparatus according to (7), wherein the control includes controlling a request to the selected wireless communication device to operate as a base station.

(9)

The apparatus according to (7) or (8), wherein the control includes providing control information for wireless communication between the selected wireless communication device and a mobile station.

(10)

The apparatus according to (9), wherein the control information includes information indicating a frequency band usable for the wireless communication.

(11)

The apparatus according to (9) or (11), wherein the control information includes information indicating a maximum transmitted power for the wireless communication.

(12)

The apparatus according to any one of (7) to (11), wherein the control includes providing control information for wireless backhaul between the selected wireless communication device and a base station.

(13)

The apparatus according to (12), wherein the control information includes information indicating the base station.

(14)

The apparatus according to (12) or (13), wherein the control information includes information indicating a frequency band usable for the wireless backhaul.

(15)

The apparatus according to any one of (7) to (14), wherein the control includes providing information relating to a core network node to which the selected wireless communication device is to be connected.

(16)

The apparatus according to any one of (7) to (15), wherein the second controller performs control for causing the selected wireless communication device to stop an operation as a base station.

(17)

The apparatus according to any one of (1) to (16), further including:

a second controller configured to request a base station adjacent to the selected wireless communication device to add a cell of the selected wireless communication device to a neighbor cell list.

(18)

The apparatus according to any one of (1) to (17), wherein the one or more wireless communication devices are wireless communication devices located in a communication area of a base station selected from among one or more base stations, and the cell includes a cell of the selected base station.

(19)

The apparatus according to (18), wherein the base station selected from among the one or more base stations is a base station selected based on information relating to traffic for each of the one or more base station.

(20)

A method including:

acquiring measurement information or position-related information for each of one or more wireless communication devices capable of operating as a mobile station and a base station, the measurement information indicating a result of measurement for a cell by a wireless communication device, the position-related information being related to a position of a wireless communication device; and selecting, by a processor, a wireless communication device to operate as a base station from among the one or more wireless communication devices based on the measurement information or the position-related information for each of the one or more wireless communication devices.

(21)

A program for causing a processor to execute:

acquiring measurement information or position-related information for each of one or more wireless communication devices capable of operating as a mobile station and a base station, the measurement information indicating a result of measurement for a cell by a wireless communication device, the position-related information being related to a position of a wireless communication device; and selecting a wireless communication device to operate as a base station from among the one or more wireless communication devices based on the measurement information or the position-related information for each of the one or more wireless communication devices.

(22)

A readable recording medium having a program recorded thereon, the program causing a processor to execute:

acquiring measurement information or position-related information for each of one or more wireless communication devices capable of operating as a mobile station and a base station, the measurement information indicating a result of measurement for a cell by a wireless communication device, the position-related information being related to a position of a wireless communication device; and selecting a wireless communication device to operate as a base station from among the one or more wireless communication devices based on the measurement information or the position-related information for each of the one or more wireless communication devices.

REFERENCE SIGNS LIST 1, 2 communication system
20 base station
21 cell
30 wireless communication device
100 control entity
131 first acquisition unit
132 first selector
133 first controller
135 second acquisition unit
136 second selector
137 second controller
200 base station
251 first controller
253 acquisition unit
255 selector
257 second controller

The invention claimed is:

1. A control method, comprising:

managing, using processing circuitry, wireless communication device information relating to a wireless communication device operating as a second base station in a cell of a first base station, the wireless communication device information including operation mode information indicating a current operation mode of the wireless communication device and position information indicating a position of the wireless communication device, the operation mode being either a base station mode or a mobile station mode depending on the current operation mode of the wireless communication device, wherein the wireless communication device in the mobile station mode performs wireless communication with the first base station and the current operation mode of the wireless communication device is the mobile station mode;

selecting the wireless communication device being requested to operate as the second base station based on the position information and mobility of the wireless communication device, the wireless communication device being selected in a case where the mobility of the wireless communication device is determined to be lower than a predetermined threshold;

providing the wireless communication device with information indicating an address of a core network node to be connected upon selecting the wireless communication device and requesting the wireless communication device to operate in the base station mode as the operation mode;

receiving, from the wireless communication device via the first base station, a report indicating that the operation mode of the wireless communication device has changed to the base station mode, upon starting an operation of the base station mode; and updating, in a memory, the wireless communication device information to update the operation mode information of the wireless communication device information to indicate that the current operation mode of the wireless communication device information has been changed to the base station mode from the mobile station mode, wherein the wireless communication device communicates over beamformed wireless communication with the first base station in the case where the mobility of the wireless communication device is determined to be lower than the predetermined threshold and the operation mode of the wireless communication device has changed to the base station mode.

2. The control method according to claim 1, comprising:
sending a message for requesting to stop the operation of the base station mode to the wireless communication device selected among a plurality of wireless communication devices operating as the second base station by means of Non-Access Stratum (NAS) signaling via the first base station.

3. The control method according to claim 1, comprising:
sending a message for requesting to stop the operation of the base station mode to the wireless communication device selected among wireless communication devices operating as the second base station by means of RRC signaling by the first base station.

4. The control method according to claim 1, comprising:
receiving a message for requesting to stop the operation of the base station mode from the wireless communication device operating as the second base station.

5. The control method according to claim 1, comprising:
sending a message for requesting to stop the operation of the base station mode to the wireless communication device when the wireless communication device is located outside a target area.

6. The control method according to claim 5,
wherein the target area is the cell of a first base station.

7. The control method according to claim 5,
wherein the wireless communication device operating as the second base station is allowed to use a frequency band limited inside the target area based on the position information.

8. The control method according to claim 1,
wherein the wireless communication device information includes information indicating a frequency band and a maximum transmitted power.

9. The control method according to claim 1, comprising:
providing the wireless communication device being requested to operate as the second base station with the wireless communication device information including information identifying a base station with a wireless backhaul capability among base stations to operate as the first base station.

10. The control method according to claim 1, further comprising:
providing with information indicating a protocol or interface used between the wireless communication device in the base station mode and the core network node upon requesting the base station mode as the operation mode.

11. The control method according to claim 1, comprising:
requesting the first base station to perform a handover of a second wireless communication device located within a certain distance from the wireless communication device operating as the second base station based on traffic information, the traffic information being provided by the first base station,
wherein the handover of the second wireless communication device to the wireless communication device operating as the second base station is executed.

12. The control method according to claim 1, comprising:
requesting a plurality of base stations within a certain distance from the wireless communication device operating as the second base station to add a cell of the wireless communication device operating as the second base station in a neighboring cell list of the plurality of base stations.

13. The control method according to claim 12, comprising:
requesting the base stations within the certain distance from the wireless communication device operating as the second base station to remove the cell of the wireless communication device operating as the second base station from the neighboring cell list of the plurality of base stations, upon stopping operating as the second base station.

14. The control method according to claim 1, comprising:
requesting base stations within a certain distance from the wireless communication device operating as the second base station to change at least one of: a threshold or an offset for an event of a measurement report; or a variable relating to S-criterion for cell-selection/cell-reselection.

15. The control method according to claim 1, comprising:
determining whether the mobility of the wireless communication device is lower than the predetermined threshold.

16. The control method according to claim 1, comprising:
receiving mobility information of the wireless communication device indicating the mobility of the wireless communication device; and
determining whether the mobility of the wireless communication device is lower than the predetermined threshold using the received mobility information.

17. A control method, comprising:
managing, using processing circuitry, wireless communication device information relating to a wireless communication device operating as a second base station in a cell of a first base station, the wireless communication device information including operation mode information indicating a current operation mode of the wireless communication device, measurement information indicating a result of measurement, and mobility information indicating a mobility of the wireless communication device, the operation mode being either a base station mode or a mobile station mode depending on the current operation mode of the wireless communication device, wherein the wireless communication device in the mobile station mode performs wireless communication with the first base station and the current operation mode of the wireless communication device is the mobile station mode;

selecting the wireless communication device being requested to operate as the second base station based on the measurement information and the mobility information and requesting the wireless communication device to operate in the base station mode as the operation mode, the wireless communication device being selected in a case where the mobility of the wireless communication device is determined to be lower than a predetermined threshold, wherein the wireless communication device establishes a wireless backhaul to the first base station with beamforming configured based on the mobility information;

receiving, from the wireless communication device via the first base station, a report indicating that the operation mode of the wireless communication device has changed to the base station mode, upon starting an operation of the base station mode; and updating, in a memory, the wireless communication device information to update the operation mode information of the wireless communication device information to indicate that the current operation mode of the wireless communication device information has been changed to the base station mode from the mobile station mode, wherein the wireless communication device communicates over beamformed wireless communication with the first base station in the case where the mobility of the wireless communication device is determined to be lower than the predetermined threshold and the operation mode of the wireless communication device has changed to the base station mode.

18. The control method according to claim 17,
wherein the measurement information includes Reference Signal Received Power (RSRP).

19. The control method according to claim 17, comprising:
managing first base station information relating to the first base station, the first base station information including traffic information relating to traffic of the first base station; and
selecting the first base station based on the traffic information, wherein
the wireless communication device operating as the second base station locates in a cell of the first base station.

20. The control method according to claim 19, comprising:
generating the traffic information based on quality information indicating a quality of communication, the quality information including Reference Signal Received Power (RSRQ).

21. The control method according to claim 17, further comprising:
   providing the wireless communication device with information indicating an address of a core network node to be connected upon requesting the base station mode as the operation mode.

22. The control method according to claim 21, further comprising:
   providing with information indicating a protocol or interface used between the wireless communication device in the base station mode and the core network node upon requesting the base station mode as the operation mode.

\* \* \* \* \*